US012792583B2

(12) United States Patent
Vogan et al.

(10) Patent No.: US 12,792,583 B2
(45) Date of Patent: Nov. 10, 2026

(54) TECHNIQUES FOR ORGANIZING DATA TO REDUCE SEARCH TIME

(71) Applicant: Apple Inc., Cupertino, CA (US)

(72) Inventors: Andrew W. Vogan, Austin, TX (US); Yoram Shacham, Zichron-Ya'acov (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/544,255

(22) Filed: Dec. 18, 2023

(65) Prior Publication Data

US 2025/0021537 A1 Jan. 16, 2025

Related U.S. Application Data

(60) Provisional application No. 63/526,644, filed on Jul. 13, 2023.

(51) Int. Cl.

| | |
|---|---|
| ***G06F 16/00*** | (2019.01) |
| ***G06F 11/34*** | (2006.01) |
| ***G06F 16/22*** | (2019.01) |
| ***G06F 16/2455*** | (2019.01) |

(52) U.S. Cl.

CPC ...... *G06F 16/2246* (2019.01); *G06F 11/3423* (2013.01); *G06F 16/24561* (2019.01)

(58) Field of Classification Search

None

See application file for complete search history.

(56) References Cited

U.S. PATENT DOCUMENTS

| | | | | |
|---|---|---|---|---|
| 6,334,123 | B1 * | 12/2001 | Ross | G06F 16/2237 707/999.102 |
| 8,924,356 | B2 * | 12/2014 | Cargille | G06F 11/1435 707/649 |
| 9,141,666 | B2 * | 9/2015 | Shao | G06F 16/2462 |
| 11,055,351 | B1 * | 7/2021 | Shyu | G06F 16/2379 |
| 11,068,444 | B2 * | 7/2021 | Sharangpani | G06F 16/1744 |
| 11,947,494 | B2 * | 4/2024 | Sharangpani | G06F 16/1744 |
| 2010/0148940 | A1 * | 6/2010 | Gelvin | H01Q 9/0464 340/286.02 |
| 2010/0201516 | A1 * | 8/2010 | Gelvin | H04L 43/16 340/539.26 |
| 2011/0035491 | A1 * | 2/2011 | Gelvin | G06F 15/173 709/224 |
| 2014/0067872 | A1 * | 3/2014 | Kruglick | G06F 16/119 707/797 |
| 2015/0006509 | A1 * | 1/2015 | Shao | G06F 16/2462 707/719 |

(Continued)

*Primary Examiner* — Farhan M Syed

(74) *Attorney, Agent, or Firm* — Kyle B. Morse; BAKERHOSTETLER, LLP

(57) ABSTRACT

Some techniques are described herein for iteratively searching a search space while prefetching data needed for subsequent searches. Such techniques can be tree-based and use a different binary search for each iteration. In addition, some techniques are described herein using a data structure that includes void elements for reserving space in the data structure for new storage updates. Such techniques can automatically add additional void elements while a computer system is idle and/or stop adding the additional void elements after a predetermined time has passed. In addition, such techniques can tailor the number of void elements for different areas of the data structure based on previous and/or predicted use.

15 Claims, 22 Drawing Sheets

(56) References Cited

U.S. PATENT DOCUMENTS

| | | | | |
|---|---|---|---|---|
| 2016/0098323 | A1* | 4/2016 | Mutha | G06F 16/122<br>707/654 |
| 2019/0129798 | A1* | 5/2019 | Mutha | G06F 16/122 |
| 2019/0138500 | A1* | 5/2019 | Sharangpani | G06F 16/1744 |
| 2021/0271553 | A1* | 9/2021 | Mutha | H04L 51/42 |
| 2021/0311912 | A1* | 10/2021 | Sharangpani | G06F 16/1744 |
| 2021/0406229 | A1* | 12/2021 | Taranov | G06F 16/211 |
| 2024/0028596 | A1* | 1/2024 | Lakshman | G06F 12/0253 |
| 2024/0256489 | A1* | 8/2024 | Sharangpani | G06F 16/1744 |

* cited by examiner

TECHNIQUES FOR ORGANIZING DATA TO REDUCE SEARCH TIME

CROSS-REFERENCE TO RELATED APPLICATIONS

The present application claims priority to U.S. Provisional Patent Application Ser. No. 63/526,644, entitled "TECHNIQUES FOR ORGANIZING DATA TO REDUCE SEARCH TIME" filed Jul. 13, 2023, which is hereby incorporated by reference in its entirety for all purposes.

BACKGROUND

Physical storage devices are ubiquitous today. They are used to store and/or retrieve data for many different purposes. However, managing such physical storage devices is becoming increasingly difficult as the amount of stored data becomes larger. Accordingly, there is a need to improve database management.

SUMMARY

Current techniques for managing databases are generally ineffective and/or inefficient. For example, some current techniques for managing databases use a binary search to identify where data is located. Such techniques require use the binary search over the entire search space and require multiple accesses of memory for the binary search that return large amounts of data in each step of the binary search that is not relevant to the next step of the binary search. For another example, some current techniques for storing data in a physical storage device ignore underlying address spaces and/or use rigid data structures. Such techniques can result in the misuse of address spaces and/or require frequent refactoring.

This disclosure provides more effective and/or efficient techniques for managing databases. Such techniques are described with respect to reading and writing data in a physical storage device. However, it should be recognized that other contexts can be used with techniques described herein. For example, data other than addresses for a physical storage device can use techniques described herein. In addition, some techniques optionally complement or replace other techniques for managing databases.

Some techniques are described herein for iteratively searching a search space while prefetching data needed for subsequent searches. Such techniques can be tree-based and use a different binary search for each iteration. In addition, some techniques are described herein using a data structure that includes void elements for reserving space in the data structure for new storage updates (e.g., update requests to add new and/or different data to the data structure). Such techniques can automatically add additional void elements while a computer system is idle and/or stop adding the additional void elements after a predetermined time has passed. In addition, such techniques can tailor the number of void elements for different areas of the data structure based on previous and/or predicted use.

In some examples, a method that is performed by a computer system is described. In some examples, the method comprises: receiving a search query; identifying a search space that is divided into a first number of portions; performing, based on the search query, a first search of the first number of portions to identify a first portion; in response to performing the first search, prefetching a second number of portions corresponding to the first portion; performing, based on the search query, a second search of the second number of portions to identify a second portion, wherein the second search is different from the first search; and after performing the second search, performing a third search to identify a search result corresponding to the search query, wherein the third search is different from the second search.

In some examples, a non-transitory computer-readable storage medium storing one or more programs configured to be executed by one or more processors of a computer system is described. In some examples, the one or more programs includes instructions for: receiving a search query; identifying a search space that is divided into a first number of portions; performing, based on the search query, a first search of the first number of portions to identify a first portion; in response to performing the first search, prefetching a second number of portions corresponding to the first portion; performing, based on the search query, a second search of the second number of portions to identify a second portion, wherein the second search is different from the first search; and after performing the second search, performing a third search to identify a search result corresponding to the search query, wherein the third search is different from the second search.

In some examples, a transitory computer-readable storage medium storing one or more programs configured to be executed by one or more processors of a computer system is described. In some examples, the one or more programs includes instructions for: receiving a search query; identifying a search space that is divided into a first number of portions; performing, based on the search query, a first search of the first number of portions to identify a first portion; in response to performing the first search, prefetching a second number of portions corresponding to the first portion; performing, based on the search query, a second search of the second number of portions to identify a second portion, wherein the second search is different from the first search; and after performing the second search, performing a third search to identify a search result corresponding to the search query, wherein the third search is different from the second search.

In some examples, a computer system comprising one or more processors and memory storing one or more program configured to be executed by the one or more processors is described. In some examples, the one or more programs includes instructions for: receiving a search query; identifying a search space that is divided into a first number of portions; performing, based on the search query, a first search of the first number of portions to identify a first portion; in response to performing the first search, prefetching a second number of portions corresponding to the first portion; performing, based on the search query, a second search of the second number of portions to identify a second portion, wherein the second search is different from the first search; and after performing the second search, performing a third search to identify a search result corresponding to the search query, wherein the third search is different from the second search.

In some examples, a computer system is comprising means for performing each of the following steps: receiving a search query; identifying a search space that is divided into a first number of portions; performing, based on the search query, a first search of the first number of portions to identify a first portion; in response to performing the first search, prefetching a second number of portions corresponding to the first portion; performing, based on the search query, a second search of the second number of portions to identify a second portion, wherein the second search is different from the first search; and after performing the second search, performing a third search to identify a search result corresponding to the search query, wherein the third search is different from the second search.

In some examples, a computer program product is described. In some examples, the computer program product comprises one or more programs configured to be executed by one or more processors of a computer system. In some examples, the one or more programs include instructions for: receiving a search query; identifying a search space that is divided into a first number of portions; performing, based on the search query, a first search of the first number of portions to identify a first portion; in response to performing the first search, prefetching a second number of portions corresponding to the first portion; performing, based on the search query, a second search of the second number of portions to identify a second portion, wherein the second search is different from the first search; and after performing the second search, performing a third search to identify a search result corresponding to the search query, wherein the third search is different from the second search.

In some examples, a method that is performed by a computer system is described. In some examples, the method comprises: receiving a request to add first data to memory; and in response to receiving the request to add the first data to the memory: identifying a first node in a tree structure; identifying a first location within the first node; shifting second data in the first node from a first location in the first node to a second location in the first node, wherein the second location is different from the first location; and adding the first data to the first location.

In some examples, a non-transitory computer-readable storage medium storing one or more programs configured to be executed by one or more processors of a computer system is described. In some examples, the one or more programs includes instructions for: receiving a request to add first data to memory; and in response to receiving the request to add the first data to the memory: identifying a first node in a tree structure; identifying a first location within the first node; shifting second data in the first node from a first location in the first node to a second location in the first node, wherein the second location is different from the first location; and adding the first data to the first location.

In some examples, a transitory computer-readable storage medium storing one or more programs configured to be executed by one or more processors of a computer system is described. In some examples, the one or more programs includes instructions for: receiving a request to add first data to memory; and in response to receiving the request to add the first data to the memory: identifying a first node in a tree structure; identifying a first location within the first node; shifting second data in the first node from a first location in the first node to a second location in the first node, wherein the second location is different from the first location; and adding the first data to the first location.

In some examples, a computer system comprising one or more processors and memory storing one or more program configured to be executed by the one or more processors is described. In some examples, the one or more programs includes instructions for: receiving a request to add first data to memory; and in response to receiving the request to add the first data to the memory: identifying a first node in a tree structure; identifying a first location within the first node; shifting second data in the first node from a first location in the first node to a second location in the first node, wherein the second location is different from the first location; and adding the first data to the first location.

In some examples, a computer system is comprising means for performing each of the following steps: receiving a request to add first data to memory; and in response to receiving the request to add the first data to the memory: identifying a first node in a tree structure; identifying a first location within the first node; shifting second data in the first node from a first location in the first node to a second location in the first node, wherein the second location is different from the first location; and adding the first data to the first location.

In some examples, a computer program product is described. In some examples, the computer program product comprises one or more programs configured to be executed by one or more processors of a computer system. In some examples, the one or more programs include instructions for: receiving a request to add first data to memory; and in response to receiving the request to add the first data to the memory: identifying a first node in a tree structure; identifying a first location within the first node; shifting second data in the first node from a first location in the first node to a second location in the first node, wherein the second location is different from the first location; and adding the first data to the first location.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1:
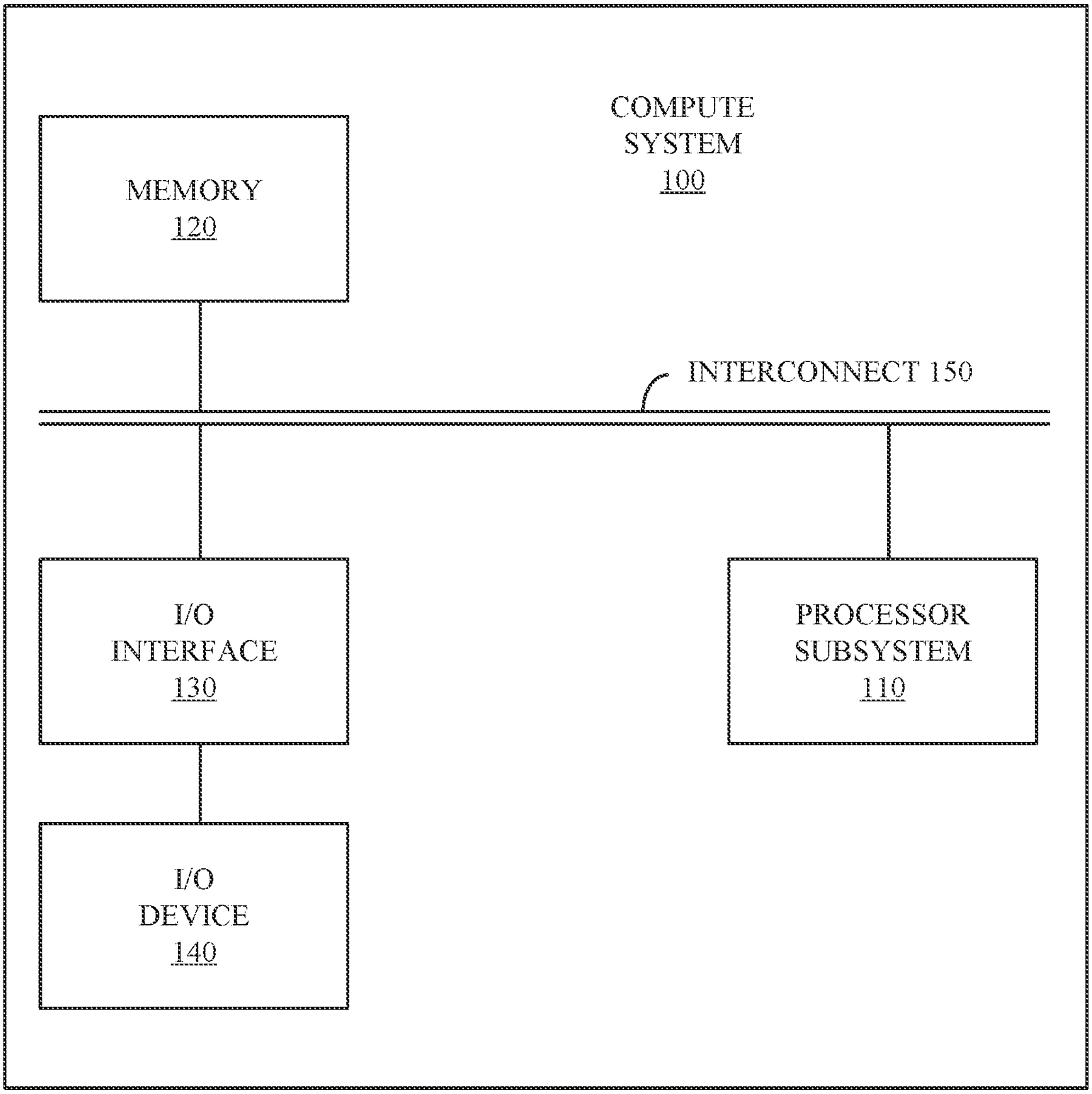
FIG. 1 is a block diagram illustrating a compute system in accordance with some examples.

The following description sets forth exemplary methods, parameters, and the like. It should be recognized, however, that such description is not intended as a limitation on the scope of the present disclosure but is instead provided as a description of exemplary embodiments.

Methods and/or processes described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer readable storage medium can repeat the steps of a method as many times as needed to ensure that all of the contingent steps have been performed.

Although the following description uses terms "first," "second," etc. to describe various elements, these elements should not be limited by the terms. In some examples, these terms are used to distinguish one element from another. For example, a first subsystem could be termed a second subsystem, and, similarly, a subsystem device could be termed a subsystem device, without departing from the scope of the various described embodiments. In some examples, the first subsystem and the second subsystem are two separate references to the same subsystem. In some embodiments, the first subsystem and the second subsystem are both subsystem, but they are not the same subsystem or the same type of subsystem.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Turning to FIG. 1, a block diagram of compute system 100 is illustrated. Compute system 100 is a non-limiting example of a compute system that can be used to perform functionality described herein. It should be recognized that other computer architectures of a compute system can be used to perform functionality described herein.

In the illustrated example, compute system 100 includes processor subsystem 110 communicating with (e.g., wired or wirelessly) memory 120 (e.g., a system memory) and I/O interface 130 via interconnect 150 (e.g., a system bus, one or more memory locations, or other communication channel for connecting multiple components of compute system 100). In addition, I/O interface 130 is communicating with (e.g., wired or wirelessly) to I/O device 140. In some examples, I/O interface 130 is included with I/O device 140 such that the two are a single component. It should be recognized that there can be one or more I/O interfaces, with each I/O interface communicating with one or more I/O devices. In some examples, multiple instances of processor subsystem 110 can be communicating via interconnect 150.

Compute system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. In some examples, compute system 100 is included or communicating with a physical component for the purpose of modifying the physical component in response to an instruction. In some examples, compute system 100 receives an instruction to modify a physical component and, in response to the instruction, causes the physical component to be modified. In some examples, the physical component is modified via an actuator, an electric signal, and/or algorithm. Examples of such physical components include an acceleration control, a break, a gear box, a hinge, a motor, a pump, a refrigeration system, a spring, a suspension system, a steering control, a pump, a vacuum system, and/or a valve. In some examples, a sensor includes one or more hardware components that detect information about a physical environment in proximity to (e.g., surrounding) the sensor. In some examples, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera sensor, a radar sensor, and/or a LiDAR sensor), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. In some examples, a sensor includes a combination of multiple sensors. In some examples, sensor data is captured by fusing data from one sensor with data from one or more other sensors. Although a single compute system is shown in FIG. 1, compute system 100 can also be implemented as two or more compute systems operating together.

In some examples, processor subsystem 110 includes one or more processors or processing units configured to execute program instructions to perform functionality described herein. For example, processor subsystem 110 can execute an operating system, a middleware system, one or more applications, or any combination thereof.

In some examples, the operating system manages resources of compute system 100. Examples of types of operating systems covered herein include batch operating systems (e.g., Multiple Virtual Storage (MVS)), time-sharing operating systems (e.g., Unix), distributed operating systems (e.g., Advanced Interactive eXecutive (AIX), network operating systems (e.g., Microsoft Windows Server), and real-time operating systems (e.g., QNX). In some examples, the operating system includes various procedures, sets of instructions, software components, and/or drivers for controlling and managing general system tasks (e.g., memory management, storage device control, power management, or the like) and for facilitating communication between various hardware and software components. In some examples, the operating system uses a priority-based scheduler that assigns a priority to different tasks that processor subsystem 110 can execute. In such examples, the priority assigned to a task is used to identify a next task to execute. In some examples, the priority-based scheduler identifies a next task to execute when a previous task finishes executing. In some examples, the highest priority task runs to completion unless another higher priority task is made ready.

In some examples, the middleware system provides one or more services and/or capabilities to applications (e.g., the one or more applications running on processor subsystem 110) outside of what the operating system offers (e.g., data management, application services, messaging, authentication, API management, or the like). In some examples, the middleware system is designed for a heterogeneous computer cluster to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some examples, the middleware system represents processes and/or operations using a graph architecture, where processing takes place in nodes that can receive, post, and multiplex sensor data messages, control messages, state messages, planning messages, actuator messages, and other messages. In such examples, the graph architecture can define an application (e.g., an application executing on processor subsystem 110 as described above) such that different operations of the application are included with different nodes in the graph architecture.

In some examples, a message sent from a first node in a graph architecture to a second node in the graph architecture is performed using a publish-subscribe model, where the first node publishes data on a channel in which the second node can subscribe. In such examples, the first node can store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 can include a computer readable medium (e.g., non-transitory or transitory computer readable medium) usable to store (e.g., configured to store, assigned to store, and/or that stores) program instructions executable by processor subsystem 110 to cause compute system 100 to perform various operations described herein. For example, memory 120 can store program instructions to implement the functionality associated with methods 900 and 1400 described below.

Memory 120 can be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, or the like), read only memory (PROM, EEPROM, or the like), or the like. Memory in compute system 100 is not limited to primary storage, such as memory 120. Compute system 100 can also include other forms of storage, such as cache memory in processor subsystem 110 and secondary storage on I/O device 140 (e.g., a hard drive, storage array, etc.). In some examples, these other forms of storage can also store program instructions executable by processor subsystem 110 to perform operations described herein. In some examples, processor subsystem 110 (or each processor within processor subsystem 110) contains a cache or other form of on-board memory.

I/O interface 130 can be any of various types of interfaces configured to communicate with other devices. In some examples, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide-area network), sensor devices (e.g., camera, radar, LiDAR, ultrasonic sensor, GPS, inertial measurement device, or the like), and auditory or visual output devices (e.g., speaker, light, screen, projector, or the like). In some examples, compute system 100 is communicating with a network via a network interface device (e.g., configured to communicate over Wi-Fi, Bluetooth, Ethernet, or the like). In some examples, compute system 100 is directly or wired to the network.

Figure 2:
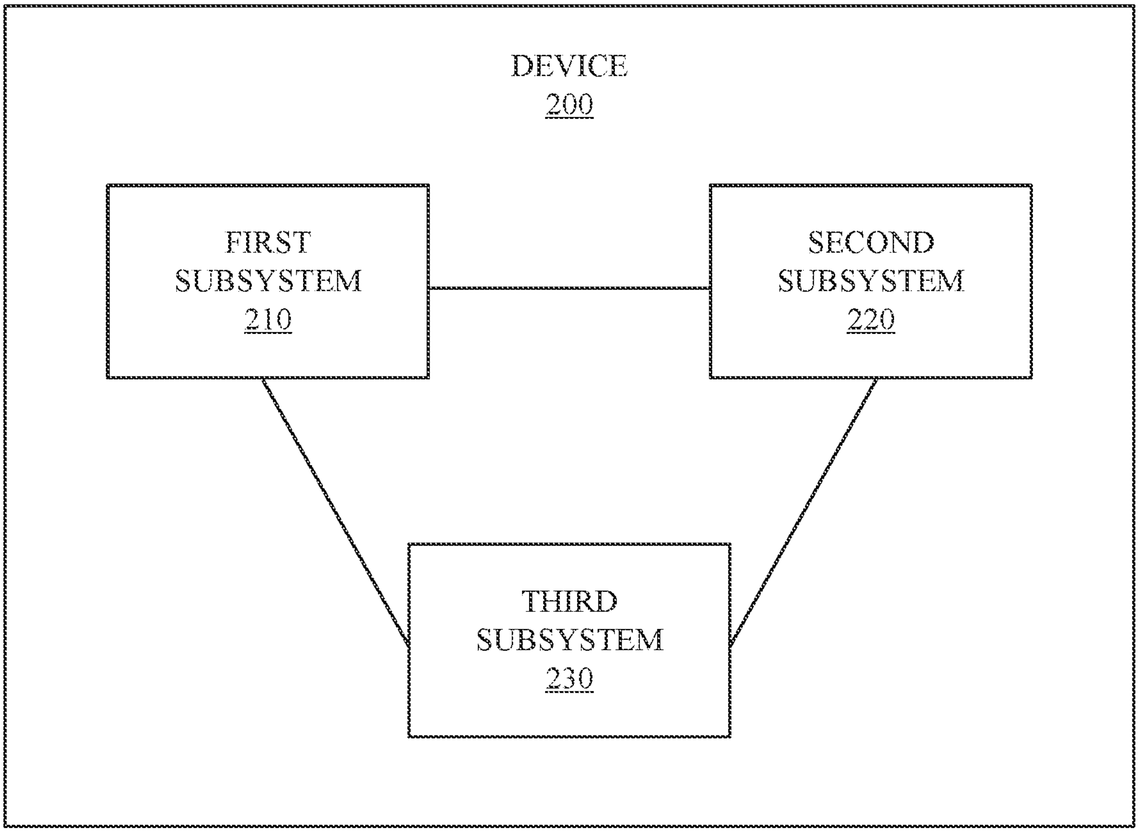
FIG. 2 is a block diagram illustrating a device with interconnected subsystems in accordance with some examples.

FIG. 2 illustrates a block diagram of device 200 with interconnected subsystems in accordance with some examples. In the illustrated example, device 200 includes three different subsystems (i.e., first subsystem 210, second subsystem 220, and third subsystem 230) communicating with (e.g., wired or wirelessly) each other, creating a network (e.g., a personal area network, a local area network, a wireless local area network, a metropolitan area network, a wide area network, a storage area network, a virtual private network, an enterprise internal private network, a campus area network, a system area network, and/or a controller area network). An example of a possible computer architecture of a subsystem as included in FIG. 2 is described in FIG. 1 (i.e., compute system 100). Although three subsystems are shown in FIG. 2, device 200 can include more or fewer subsystems.

In some examples, some subsystems are not connected to other subsystem (e.g., first subsystem 210 can be connected to second subsystem 220 and third subsystem 230 but second subsystem 220 cannot be connected to third subsystem 230). In some examples, some subsystems are connected via one or more wires while other subsystems are wirelessly connected. In some examples, messages are set between the first subsystem 210, second subsystem 220, and third subsystem 230, such that when a respective subsystem sends a message the other subsystems receive the message (e.g., via a wire and/or a bus). In some examples, one or more subsystems are wirelessly connected to one or more compute systems outside of device 200, such as a server system. In such examples, the subsystem can be configured to communicate wirelessly to the one or more compute systems outside of device 200.

In some examples, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some examples, device 200 is configured to navigate (with or without user input) in a physical environment.

In some examples, one or more subsystems of device 200 are used to control, manage, and/or receive data from one or more other subsystems of device 200 and/or one or more compute systems remote from device 200. For example, first subsystem 210 and second subsystem 220 can each be a camera that captures images, and third subsystem 230 can use the captured images for decision making. In some examples, at least a portion of device 200 functions as a distributed compute system. For example, a task can be split into different portions, where a first portion is executed by first subsystem 210 and a second portion is executed by second subsystem 220.

Figure 3:
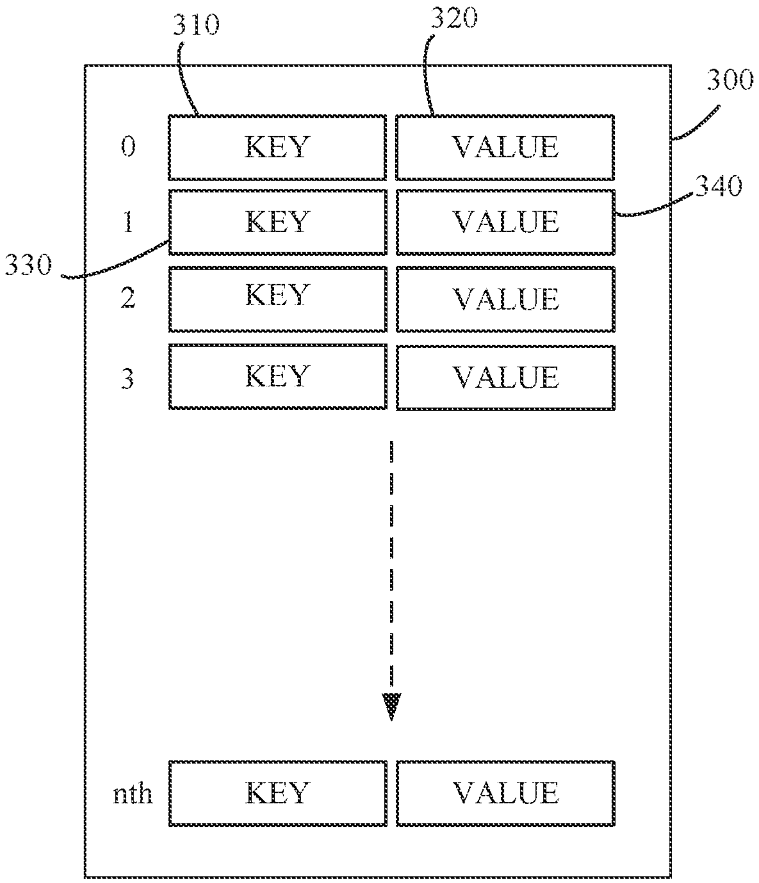
FIG. 3 is a block diagram illustrating a key-value pair configuration of a database in accordance with some examples.

FIG. 3 is a block diagram illustrating a key-value pair configuration of a database (e.g., database 300) in accordance with some examples. As illustrated in FIG. 3, database 300 includes multiple keys (e.g., key 310 and key 330) and multiple values (e.g., value 320 and value 340), each key stored in a location adjacent to a value (e.g., key 310 is adjacent to value 320, key 310 is not adjacent to 340, and key 330 is adjacent to value 340). In some examples, the keys are used as identifiers to retrieve adjacent values (e.g., key 310 is used to retrieve value 320 and key 330 is used to retrieve value 340). In such examples, keys (e.g., key 310 and key 330) are each unique in a search space so that there is no ambiguity when searching for a key while values (e.g., value 320 and value 340) are not necessarily unique because they are identified by a respective key.

In some examples, database 300 is a data structure (e.g., an associative array) used to obtain data stored in a physical storage device, such as a hard-disk drive or a solid-state drive. For example, the physical storage device can be divided into physical blocks of memory, and each block of memory can be assigned a physical block address (PBA). In such an example, a PBA is mapped to a logical block address (LBA) that is used by a computer system to identify the PBA (e.g., a location of data). In some examples, a key or a value of database 300 includes an LBA. For example, a key of database 300 can include an indication of data stored at a particular PBA, and a value of database 300 corresponding the key includes a LBA for retrieving the data. The data stored at the PBA can be any type of data, including a string, binary data, multimedia data, and/or another type of data.

As mentioned above, the key-value pair configuration of database 300 has a respective key stored adjacent to a respective value corresponding to the respective key. That is, each key is stored adjacent to a value corresponding to the key instead of another key. Such an organization is an example of the keys and values not being continuous. As a result of this configuration, retrieval of an amount of continuous data (e.g., one or more cache lines) in database 300 results in retrieval of a set of keys and a set of values corresponding to the set of keys, returning less keys for the same amount of memory than if the values were not stored adjacent to the keys.

Figure 4:
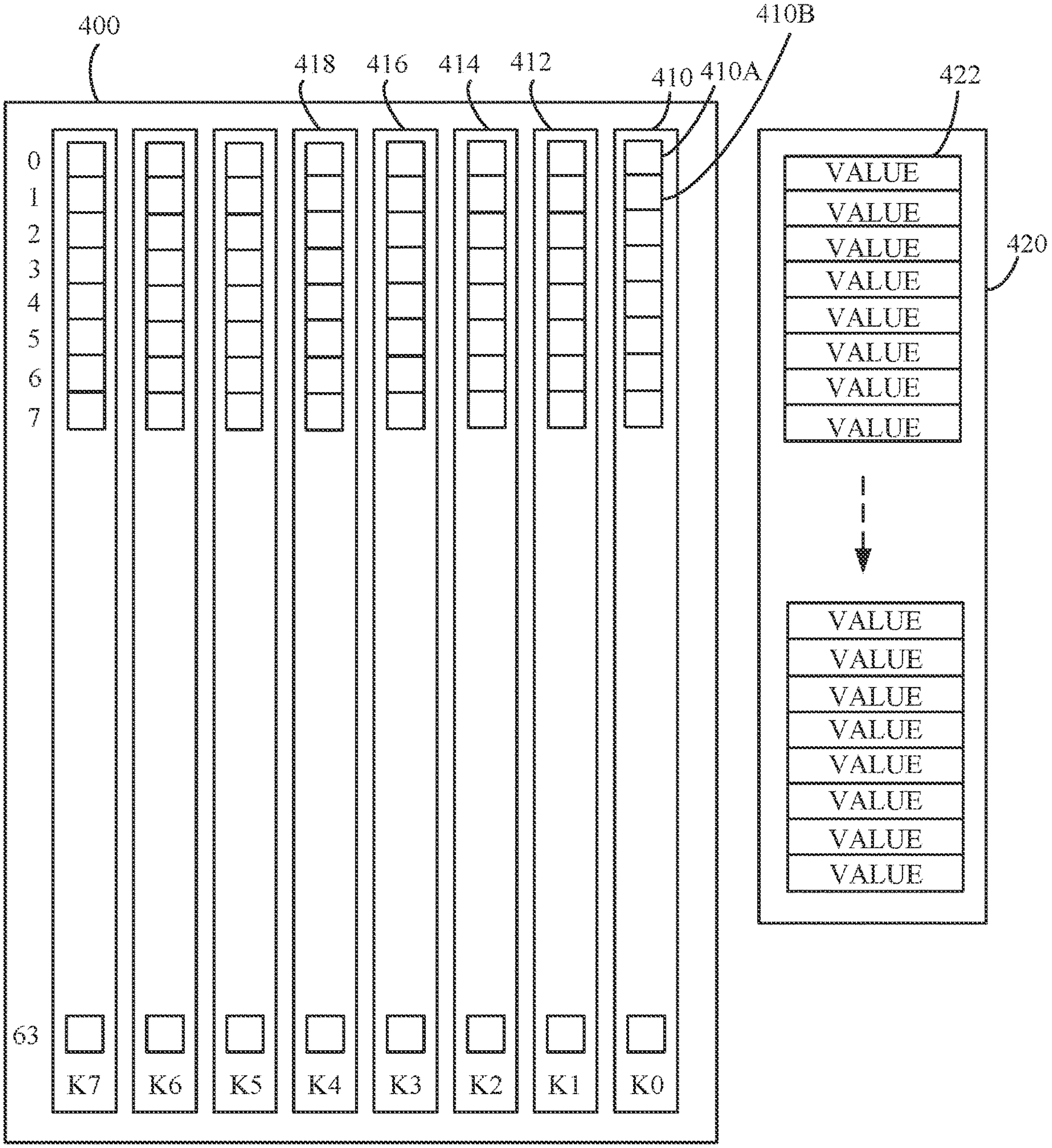
FIG. 4 is a block diagram illustrating a key-value pair configuration of a database in accordance with some examples.

FIG. 4 is a block diagram illustrating a key-value pair configuration of a database (e.g., database 400) in accordance with some examples. In FIG. 4, the keys (e.g., key 410A and key 410B) are ordered in a continuous space. That is, each key is followed by another key, instead of a corresponding value. Likewise, the values (e.g., value 422) are ordered in a continuous space without keys being stored between (and/or adjacent to) values. With this configuration, retrieval of keys from database 400 results in the retrieval of more keys for the same amount of continuous data (e.g., one or more cache lines) as compared to database 300 of FIG. 3.

Using the key-value pair configuration of database 400, a computer system can perform an unpredictable memory fetch and fetch one or more cache lines concurrently using a processor prefetch model. Each of the fetched cache lines can include keys of a key-value pair (e.g., without including corresponding values). Once a desired key is found, a corresponding value can be accessed. In some examples, concurrently fetching cache lines improves the overall latency of a search, as the computer system receives each cache line simultaneously and/or concurrently instead of needing to perform the retrievals iteratively. Additionally, the computer system does not need to search across values as, in some examples, required using database 300 of FIG. 3.

Attention is now directed towards techniques for searching databases. Such techniques are described with respect to reading data from a physical storage device. However, it should be recognized that other contexts can be used with techniques described herein. For example, a data structure storing data other than LBAs and/or PBAs can use techniques described herein. In addition, some techniques optionally complement or replace other techniques for searching databases.

Figure 5:
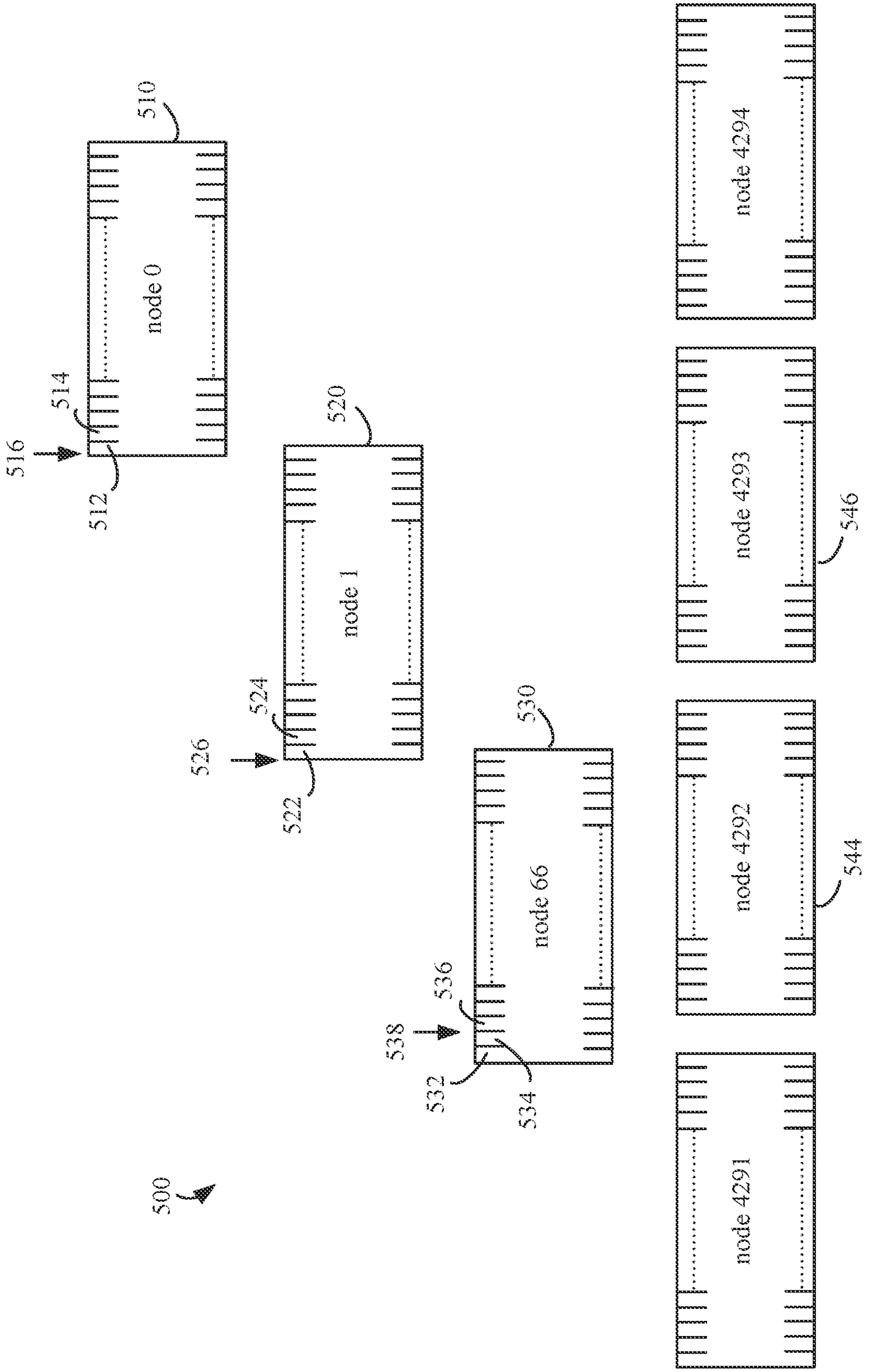
FIG. 5 is a block diagram illustrating a search technique for a key-value pair configuration in accordance with some examples.

FIG. 5 is a block diagram illustrating a search technique for a key-value pair configuration (e.g., as described above with respect to database 300 of FIG. 3 and/or database 400 of FIG. 4) in accordance with some examples. FIG. 5 illustrates an example of a four-level tree (referred to as tree 500). As illustrated, root 510 includes elements 512 and 514; branch 520 includes elements 522 and 524; branch 530 includes elements 532, 534, and 536. In some examples, an element of a node includes a key and/or a value. For example, each element of a root can include a key to identify the element of the root (referred to as a key of the node) and a corresponding key to identify a branch and/or a leaf of the root (referred to as a value of the node). Each element of a branch can include a key to identify the element of the branch (referred to as a key of the node) and a corresponding key to identify a branch and/or a leaf of the branch (referred to as a value of the node). Each element of a leaf can include a key and/or a value (e.g., a key and value of a key-value pair).

In some examples, a database (e.g., database 300 of FIG. 3 and/or database 400 of FIG. 4) is structured so that each node has a fixed relationship with each other node. In such examples, no pointers (e.g., reference pointers and/or memory pointers) are needed when going from one node to another during a search. Instead, arithmetic can be used to move from one node to another. For example, in FIG. 5, a search for a key can be performed using the following formula:

$$Vec_{n-1} = f_s(\text{node, key}) = [0\,..\,64] \text{ and } f_n(\text{node}, Vec_{n-1}) = \text{node} * 65 + 1 + Vec_{n-1}.$$

Using the formula, the number [0 . . . 64] corresponds to the number of nodes on a level of the tree and can change based on a number of branch and/or leaf nodes for a current level.

Referring to FIG. 5, a search for a desired key can begin with prefetching data (e.g., cache lines) related to node 0 (e.g., root 510). The prefetched data related to root 510 can include (1) keys of root 510 and (2) keys of branch nodes of root 510, such that the keys of root 510 can be searched and keys of a resulting branch node from the search can already be fetched. Once the data related to root 510 is prefetched, a first search (e.g., a binary search) is performed using the keys of root 510 to identify a branch node of root 510. The first search returns vector 0 (indicated by arrow 516 pointing to left of element 512), which using the formula above (e.g., 0*65+1+0) results in identifying node 1 (e.g., branch 520). As a result of identifying branch 520, data related to branch 520 is prefetched, and a second search (e.g., another binary search) is performed on the keys of branch 520. The prefetched data related to branch 520 can include (1) keys of branch 520 and (2) keys of branch nodes of branch 520. The second search returns vector 0 (indicated by arrow 526 pointing to left of element 522), which using the formula above (e.g., 1*65+1+0) results in identifying node 66 (e.g., branch 530). As a result of identifying branch 530, data related to branch 530 is prefetched, and a third search (e.g., another binary search) is performed on the keys of branch 530. The prefetched data related to branch 530 can include (1) keys of branch 530 and (2) keys and/or values of leaf nodes of branch 530. The third search returns vector 2 (indicated by arrow 538 pointing to right of element 534 and left of element 536), which using the formula above (e.g., 34*65+1+2) results in identifying node 4293 (e.g., leaf 546). As a result of identifying leaf 546, a fourth search (e.g., another binary search) is performed on the keys of leaf 546 to identify the desired key, which can be used to obtain a corresponding value (e.g., an LBA and/or PBA) of the desired key. It should be recognized that, while binary searches were used to search through keys in the discussion above, any type of search can be used and that the searches are used to narrow down the search space iteratively (e.g., the search space is divided into segments and keys corresponding to each segment are searched instead of the entire search space).

Figure 6:
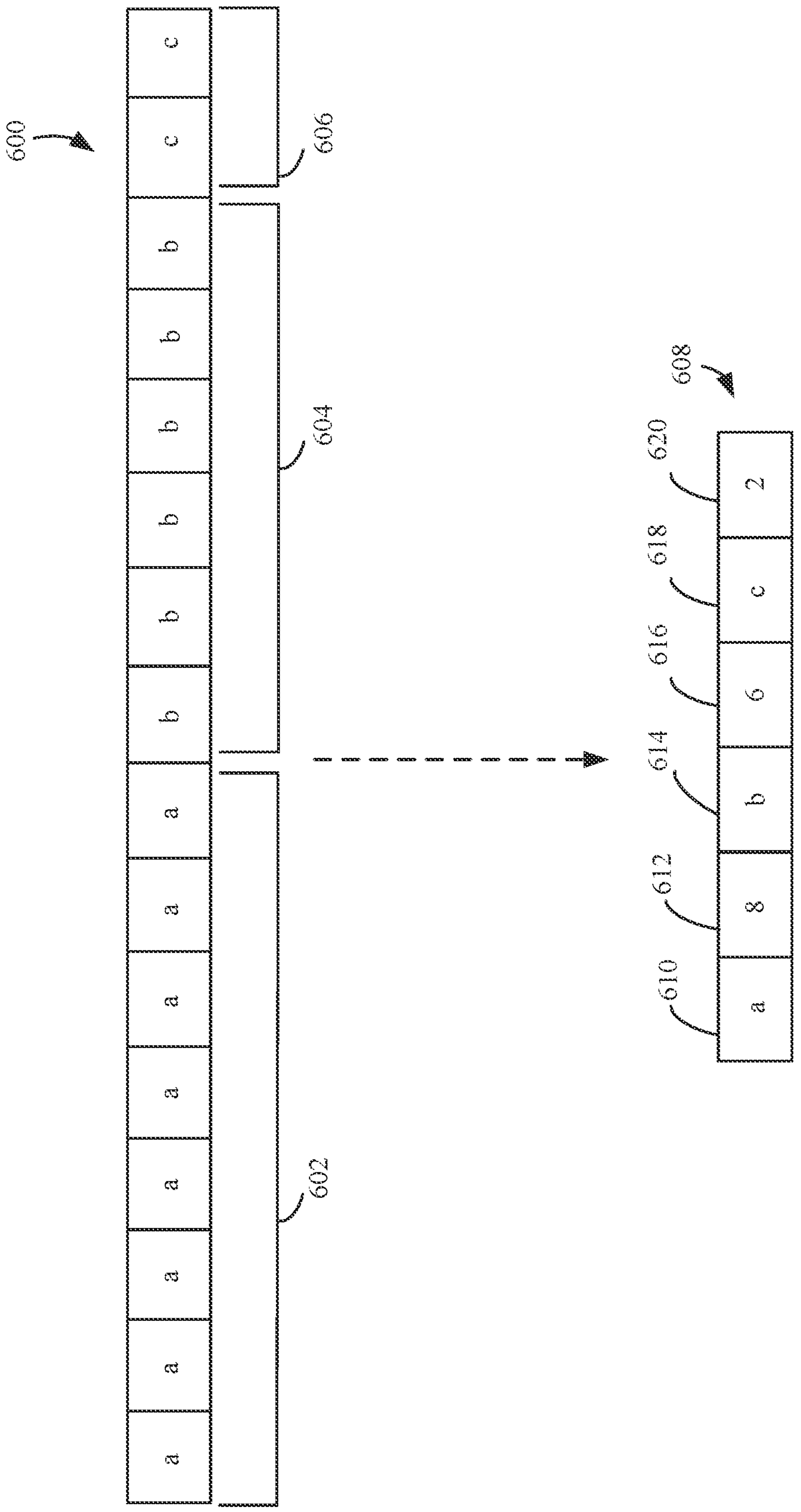
FIG. 6 is a block diagram illustrating an example of run length encoding in accordance with some examples.

FIG. 6 a block diagram illustrating an example of run length encoding in accordance with some examples. As used herein, run length encoding is a compression algorithm that reduces data size by representing repeated consecutive characters and/or values in a compressed form. For example, in FIG. 6, data string 600 is "aaaaaaaabbbbbbcc". The character "a" is repeated 8 times (as identified by indication 602), the character "b" is repeated 6 times (as identified by indication 604), and the character "c" is repeated 2 times (as identified by indication 606). Using run length encoding, data string 608 (e.g., "a8b6c2") can be used to represent data string 600. In data string 610: the character "a" (as identified by indication 610) appears next to "8" (as identified by indication 612), representing that there are 8 instances of the character "a"; character "b" (as identified by indication 614) appears next to "6" (as identified by indication 616), representing that there are 6 instances of the character "b"; and the character "c" (as identified by indication 618) appears next to "2" (as identified by indication 620), representing that there are 2 instances of the character "c".

Figure 7:
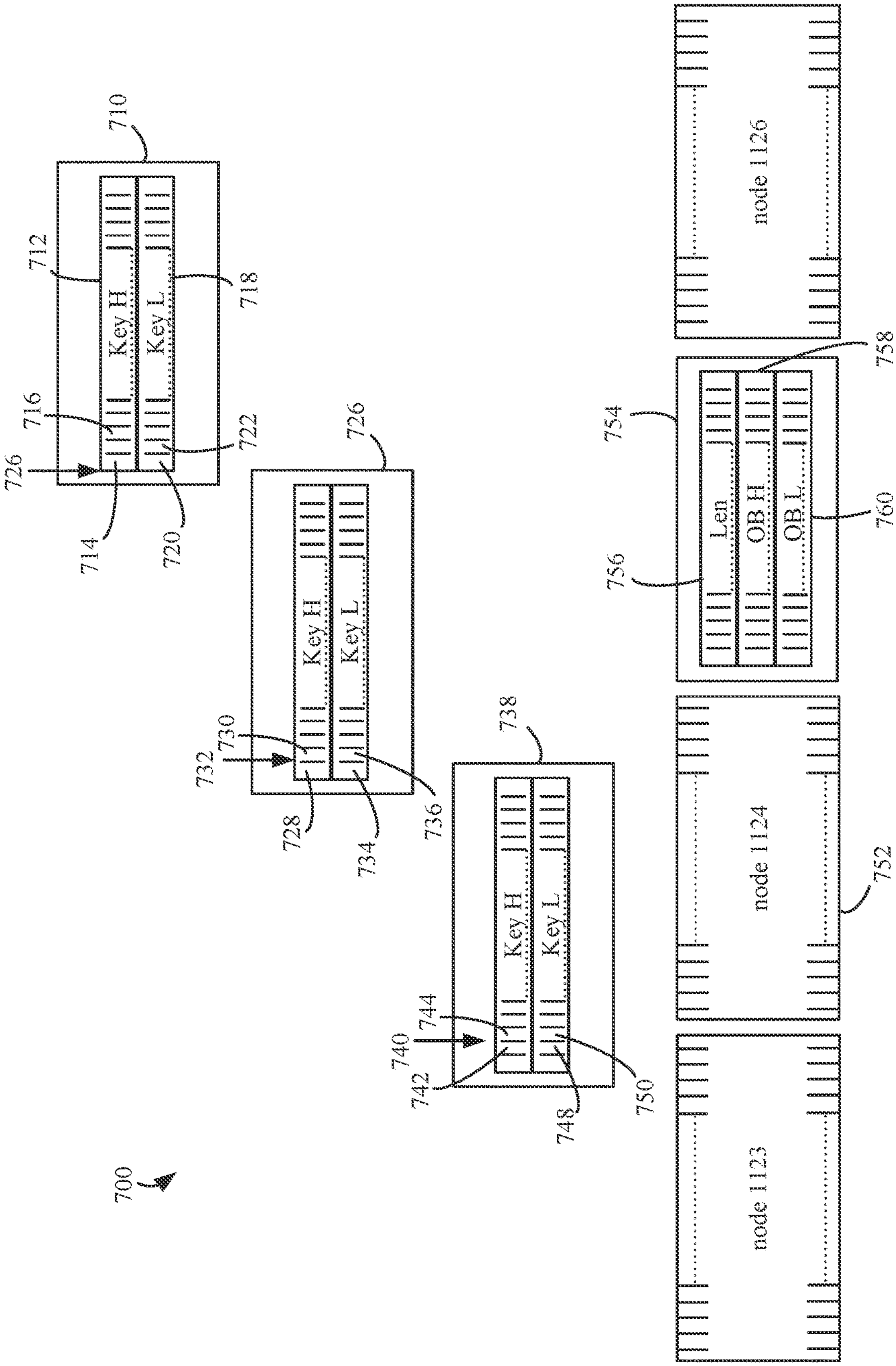
FIG. 7 is a block diagram illustrating an example of a search technique for run length encoded data in accordance with some examples.

FIG. 7 is a block diagram illustrating an example of a search technique for run length encoded data in accordance with some examples. FIG. 7 illustrates an example of a four-level tree (referred to as tree 700).

In some examples, an element of a node of tree 700 includes a key and/or a value. For example, each element of a root and/or branch node of tree 700 can include a first subset of bits (e.g., Key H 712, including a number of more significant bits (e.g., most significant bits), such as 1-5) and/or a second subset of bits (e.g., Key L 718, including a number of less significant bits (e.g., least significant bits), such as 1-5). In some examples, the first subset of bits of a root and/or branch node combined with the second subset of bits of the root and/or branch node correspond to a key, a segment of keys, an address (e.g., LBA or PBA), and/or a segment of addresses. For another example of elements in a node, each element of a leaf node of tree 700 can include a fragment length (756), a first subset of bits (e.g., OB H 758, including a number of more significant bits (e.g., most significant bits), such as 1-5), and/or a second subset of bits (e.g., OB L 760, including a number of less significant bits (e.g., least significant bits), such as 1-5). In some examples, the first subset of bits of a leaf node combined with the second subset of bits of the leaf node correspond to a key and/or a value (e.g., an address (e.g., LBA or PBA)). In such examples, the value can be run length encoded and require the fragment length to be properly identified.

As mentioned above, in some examples, a database (e.g., database 300 and/or database 400) is structured to have nodes with a fixed relationship with each other node. In such examples, arithmetic can be used to move from one node to another. For example, in FIG. 7, a search for a key can be performed using the following formula:

$$Vec_{n-1} = f_s(\text{node, key}) = [0\,..\,32] \text{ and } f_n(\text{node}, Vec_{n-1}) = \text{node} * 33 + 1 + Vec_{n-1}.$$

Using the formula, the number [0 . . . 32] can change based on a number of branch and/or leaf nodes for a current node.

Referring to FIG. 7, a search for a desired key can begin with prefetching data (e.g., cache lines) related to root 710 (sometimes referred to as node 0, as identifier for root 710 can be 0). The prefetched data related to root 710 can include (1) keys of root 710 and (2) keys of branch nodes of root 710, such that keys of a branch node identified from a search of the keys of root 710 would already be fetched. Once the data is prefetched, a first search (e.g., a binary search) is performed using the keys of root 710 (e.g., Key H 712 and/or Key L 718) to identify a branch node of root 710.

In some examples, the first search returns vector 0 (indicated by arrow 726 pointing to left of element 714), which using the formula above results in identifying branch 726 (sometimes referred to as node 1, as identifier for branch 726 can be 1). As a result of identifying branch 726, data related to branch 726 is prefetched, and a second search (e.g., another binary search) is performed on keys of branch 726. The prefetched data related to branch 726 can includes (1) the keys of branch 726 and (2) keys of branch nodes of branch 726.

In some examples, the second search returns vector 1 (indicated by arrow 732 pointing to right of element 728 and left of element 730), which using the formula above results in identifying branch 738 (sometimes referred to as node 34, as identifier for branch 738 can be 34). As a result of identifying branch 738, data related to branch 738 is prefetched, and a third search (e.g., another binary search) is performed on keys of branch 738. The prefetched data related to branch 738 can include (1) the keys of branch 738 and (2) keys and/or values of leaf nodes of branch 738.

In some examples, the third search returns vector 2 (indicated by arrow 740 pointing to right of element 742 and left of element 744), which using the formula above results in identifying leaf 754 (sometimes referred to as node 1125, as identifier for leaf 754 can be 1125). As a result of identifying leaf 754, a fourth search (e.g., another binary search) is performed on keys of leaf 754 to identify the desired key, which can be used to obtain a corresponding value (e.g., a run length encoded value identified using a fragment length, OB H 758, and OB L 760 corresponding to the desired key). It should be recognized that, while binary searches were used to search through keys in the discussion above, any type of search can be used and that the searches are used to narrow down the search space iteratively (e.g., the search space is divided into segments and keys corresponding to each segment is searched instead of the entire search space).

Figure 8:
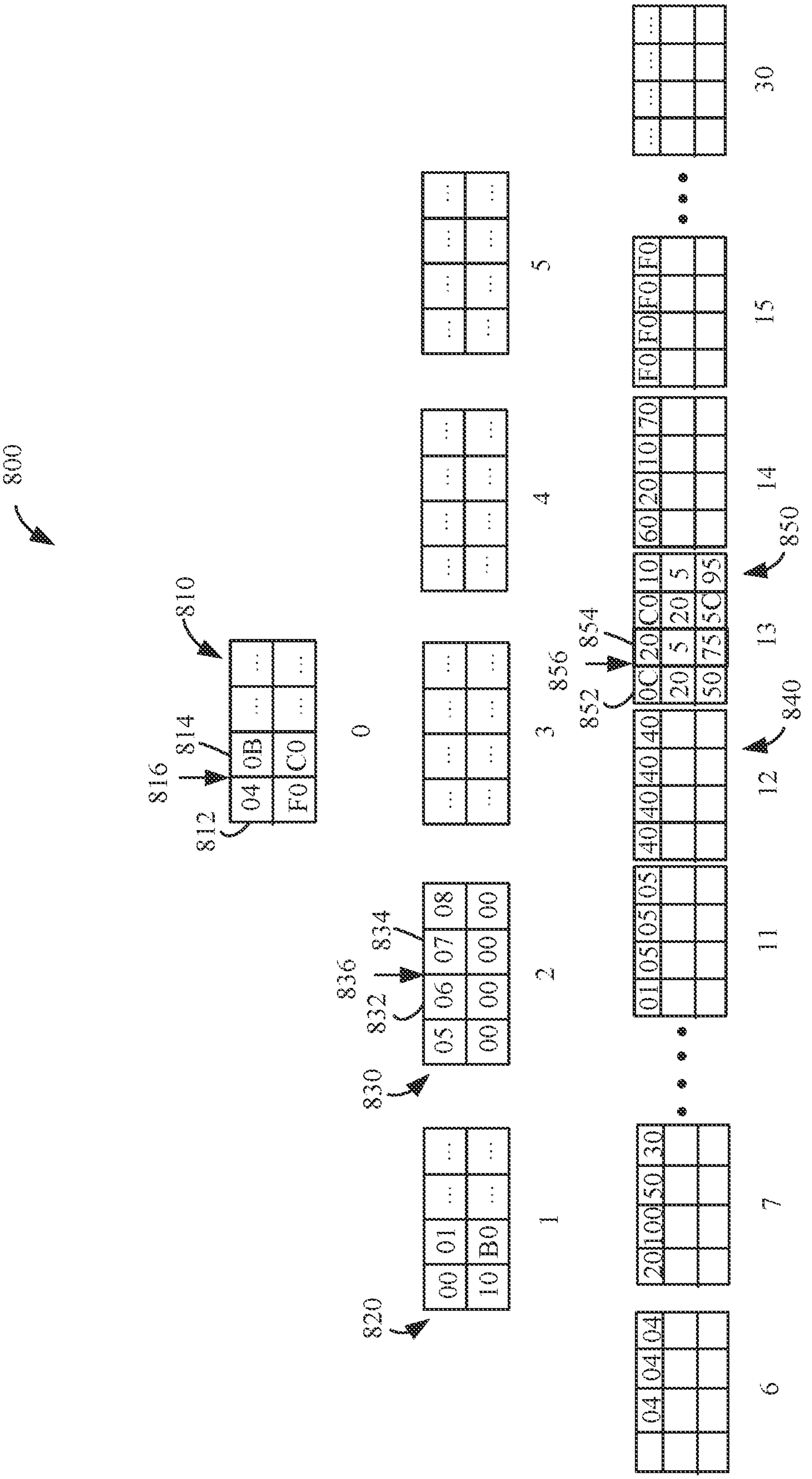
FIG. 8 is a block diagram illustrating an example of a search technique for run length encoded data in accordance with some examples.

FIG. 8 is a block diagram illustrating an example of a search technique for run length encoded data in accordance with some examples. FIG. 8 illustrates an example of a three-level tree (referred to as tree 800).

In some examples, an element of a node of tree 800 includes a key and/or a value. For example, each element of a root and/or branch node of tree 800 can include a first subset of bits (e.g., “04” in 812, including a number of more significant bits (e.g., most significant bits), such as 1-5) and/or a second subset of bits (e.g., “F0” in 812, including a number of less significant bits (e.g., least significant bits), such as 1-5). In some examples, the first subset of bits of a root and/or branch node combined with the second subset of bits of the root and/or branch node (e.g., “04F0” for 812, representing an LBA) correspond to a key, a segment of keys, an address (e.g., LBA or PBA), and/or a segment of addresses. For another example of elements in a node, each element of a leaf node of tree 800 can include a fragment length (e.g., “20” in 854, representing the fragment length in hexadecimal), a first subset of bits (e.g., “5” in 854, including a number of more significant bits (e.g., most significant bits), such as 1-5), and/or a second subset of bits (e.g., “75” in 854, including a number of less significant bits (e.g., least significant bits), such as 1-5). In some examples, the first subset of bits of a leaf node combined with the second subset of bits of the leaf node (e.g., “575” for 854, representing an LBA, such as a beginning of run length encoded data) correspond to a key and/or a value (e.g., an address (e.g., LBA or PBA)). In such examples, the value can be run length encoded and require the fragment length to properly identify.

As mentioned above, in some examples, a structure of a database (e.g., database 300 of FIG. 3 and/or database 400 of FIG. 4) results with each node having a fixed relationship with each other node. In such examples, arithmetic can be used to move from one node to another. For example, in FIG. 8, a search for a key can be performed using the following formula $Vec_{n-1}=f_s(\text{node, key})=[0\ .\ .\ .\ 4]$ and $f_n(\text{node}, Vec_{n-1})=\text{node}*5+1+Vec_{n-1}$. Using the formula, the number [0 . . . 4] can change based on a number of branch and/or leaf nodes for a current node.

Referring to FIG. 8, a search for a desired key (e.g., LBA 0610, in hexadecimal) can begin with prefetching data (e.g., cache lines) related to root 810 (labeled as node 0, to indicate identifier for root 810 is 0). The prefetched data related to root 810 can include keys of root 810 and keys of branches of root 810, such that keys of a branch node identified from a search of the keys of root 810 would already be fetched. Once the data related to root 810 is prefetched, a first search (e.g., a binary search) is performed using the keys of root 810 (e.g., 812 and 814) to identify a branch node of root 810.

In some examples, the first search (e.g., identifying where “0610” falls between keys of root 810) returns vector 1 (indicated by arrow 816 pointing to right of element 812 and left of element 814), which using the formula above (e.g., 0*5+1+1) results in identifying branch 830 (labeled as node 2, to indicate identifier for branch 830 is 2). As a result of identifying branch 830, data related to branch 830 is prefetched, and a second search (e.g., a binary search) is performed on keys of branch 830. The prefetched data related to branch 830 can include (1) the keys of branch 830 and (2) keys and/or values of leaf nodes of branch 830.

In some examples, the second search (e.g., identifying where “0610” falls between keys of branch 830) returns vector 2 (indicated by arrow 836 pointing to right of element 832 and left of element 834), which using the formula above (e.g., 2*5+1+2) results in identifying leaf 850 (labeled as node 13, to indicate identifier for leaf 850 is 13). As a result of identifying leaf 850, a third search (e.g., another binary search) (e.g., a size search) is performed to identify the desired key, which can be used to obtain a corresponding value (e.g., a run length encoded value identified using a fragment length (e.g., “20” in 854), OB H (e.g., “5” in 854), and OB L (e.g., “75” in 854) corresponding to the desired key).

In some examples, the third search (e.g., identifying where “0610” falls in leaf 850) returns vector 1 (indicated by arrow 856 pointing to right of element 852 and left of element 854). Using element 854 (identified by the third search), an OB can be computed to obtain the result of the search for the desired key. The OB can be computed using the following equation:

$$\text{node[vector]}\cdot OB + (\text{key} - PrevEnt(\text{node[vector]}\cdot\text{key}) - \text{a sum of the fragment sizes before node[vector]}.$$

For this equation: (1) node[vector].OB is “0x0575” (referring to combining “5” and “75” in element 854); (2) key is 0x0610 (referring to the desired key); (3) PrevEnt(node [vector].key) is “0x0600” (referring to key from node 830 (e.g., referring to combining “06” and “00” in node 830)); and (4) the sum of the fragment sizes before node[vector] is “0x000C” (referring to fragment size in element 852, which is “OC”). The result of the equation is “0x0579 . . . 0x57E”.

It should be recognized that, while binary searches were used to search through keys in the discussion above, any type of search can be used and that the searches are used to narrow down the search space iteratively (e.g., the search space is divided into segments and keys corresponding to each segment is searched instead of the entire search space).

Figure 9:
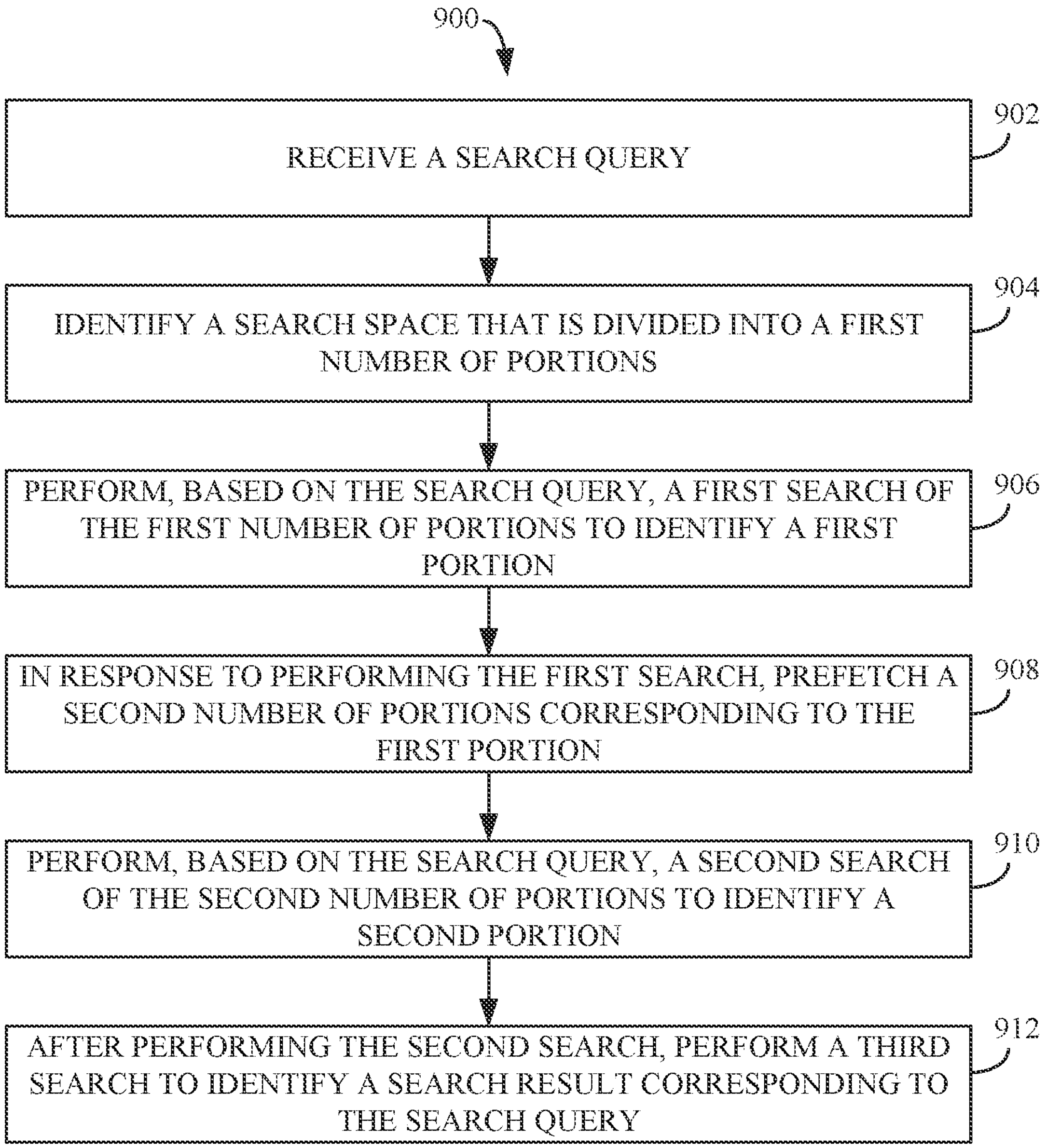
FIG. 9 is a flow diagram illustrating a method for searching a database in accordance with some examples.

FIG. 9 is a flow diagram illustrating a method (e.g., method 900) for searching a database in accordance with some examples. Some operations in method 900 are, optionally, combined, the orders of some operations are, optionally, changed, and some operations are, optionally, omitted.

At 902, the computer system receives a search query. In some examples, the search query corresponds to and/or is for a physical storage device (e.g., volatile or non-volatile memory). In some examples, receiving the search query includes detecting input (e.g., user input) to perform a search. In some examples, the search query is received without user input (e.g., an application and/or software program sends a request to perform a search corresponding to the search query).

At 904, the computer system identifies a search space that is divided (e.g., fragmented) into a first number of portions. In some examples, each portion of the first number of portions is the same size. In some examples, the first number of portions is 1. In some examples, the first number of portions is 2 or more. In some examples, the search space is represented by a first number of bits. In some examples, the search space is divided by taking a first number of bits (e.g., a first number of most significant bits). In some examples, the search space is identified by performing a fourth search different from the first search, the second search, and the third search. In some examples, the fourth search is of a third number of portions, where a portion of the third number of portions is the search space. In some examples, the fourth search is a binary search. In some examples, the search space is a single track. In some examples, the search space is a single head. In some examples, search space is a single sector. In some examples, a single track includes the search space. In some examples, a single head includes the search space. In some examples, a single sector includes the search space. In some examples, the search space includes multiple silos, each silo including a tree data structure with a root node and a plurality of branch nodes followed by a plurality of leaf nodes. In such examples, a silo is first selected before performing one or more search techniques described herein. In some examples, the first number of portions is a first number of cache lines. In some examples, the search space is a single node. In some examples, a single node includes the first number of portions. In some examples, the search space is a root node of a tree structure. In some examples, the search space is a branch leaf of a tree structure. In some examples, the search space includes a single silo. In some examples, a single silo includes the search space. In some examples, the first number of portions is a first number of most significant bits of an LBA (e.g., corresponding to the physical storage device). In some examples, each portion of the first number of portions includes a high value and a low value. In some examples, the search space is an ordered data set.

At 906, the computer system performs, based on the search query, a first search of the first number of portions to identify a first portion (e.g., of the first number of portions). In some examples, performing the first search includes searching for a result of the search query. In some examples, performing the first search includes identifying a portion of the first number of portions that includes a result of the search query (e.g., the result is between a high value and a low value of the portion).

At 908, in response to performing the first search, the computer system prefetches (e.g., transfer from a first memory (e.g., a main memory, such as the physical storage device) to a second memory (e.g., a temporary storage)) a second number of portions corresponding to the first portion. In some examples, each portion of the second number of portions is the same size. In some examples, the second number of portions is 1. In some examples, the second number of portions is 2 or more. In some examples, the second number of portions is the same number of portions as the first number of portions. In some examples, the second number of portions is the same size as the first number of portions. In some examples, the second number of portions is a different size than the first number of portions. In some examples, the second number of portions is a different number of portions than the first number of portions. In some examples, the second number of portions is represented by a second number of bits different from the first number of bits. In some examples, the second number of portions is represented by the first number of bits. In some examples, the second number of portions are included in the first portion. In some examples, the second number of portions is a second number of cache lines (e.g., 1, 2, 4, 8, 16, or 32). In some examples, each portion (e.g., each cache line) of the second number of portions is prefetched into a different bank of DRAM (dynamic random access memory) space. In some examples, the second number of cache lines is the same as the first number of cache lines. In some examples, the second number of cache lines is different from the first number of cache lines. In some examples, the second number of portions is a single node. In some examples, a single node includes the second number of portions. In some examples, the second number of portions is a branch leaf of a tree structure. In some examples, the first number of portions is a second number (e.g., different from or the same as the first number) of most significant bits of an LBA (e.g., corresponding to the physical storage device). In some examples, each portion of the second number of portions includes a high value and a low value. In some examples, the second number of portions are prefetched at least partially in parallel.

At 910, the computer system performs, based on the search query, a second search (e.g., after performing the first search) of the second number of portions to identify a second portion (e.g., of the second number of portions), wherein the second search is different from the first search. In some examples, performing the second search includes searching for a result of the search query. In some examples, the second search includes identifying a portion of the second number of portions that includes a result of the search query (e.g., the result is between a high value and a low value of the portion).

At 912, after performing the second search (e.g., and without obtaining and/or prefetching another portion), the computer system performs a third search to identify a search result (e.g., a logical block address (LBA)) corresponding to the search query, wherein the third search is different from the second search. In some examples, the computer system identifies a physical address using the search result. In some examples, performing the third search includes searching for a result of the search query. In some examples, performing the third search includes identifying a portion that includes a result of the search query (e.g., the result is between a high value and a low value of the portion).

In some examples, the search result includes a key (e.g., a unique address corresponding to a respective associated value). In some examples, the key is used to obtain a corresponding value (e.g., a memory location in a physical storage device). In some examples, the search result includes a key when the search query is with respect to a key-value store.

In some examples, the search result includes a range of memory (e.g., a fragment and/or portion of memory). In some examples, a respective search result of the first search and/or the second search includes one or more keys while the search result does not include one or more keys. In some examples, the range varies in size for different searches such that different search queries result in search results with different ranges. In some examples, the search result includes a range of memory when the search query is performed with respect to a run-length encoded store.

In some examples, the search space includes a tree structure to store data. In some examples, the tree structure includes at least one branch node that is fully packed and at least one leaf node that is not fully packed (e.g., a fully packed node is when both a left and a right child of the node is present and/or not null). In some examples, the tree structure includes a plurality of branch nodes and a plurality of leaf nodes. In some examples, all branch nodes of the tree structure are fully packed. In some examples, one or more leaf nodes of the tree structure are not fully packed. In some examples, the tree structure is a binary tree, a binary search tree, and/or a balanced search tree.

In some examples, the first number of portions are located in a first predefined area of memory. In some examples, the second number of portions are located in a second predefined area of memory such that the second number of portions are identified using arithmetic (e.g., and without using a pointer). In some examples, the search space includes a plurality of nodes having a fixed relationship to each other.

In some examples, data in the second portion is continuous in a logical block address (LBA) space. In some examples, data corresponding to the second portion is continuous in a physical block space (PBA). In some examples, the data in the second portion includes a plurality of keys. In such examples, the plurality of keys is adjacent to each other in the LBA space and/or the PBA space such that there is not data other than a key between two other keys in the plurality of keys. In some examples, a value corresponding to a key is not stored adjacent to the key and another key in the LBA space and/or the PBA space.

In some examples, a size of a portion of the first number of portions is different than a size of a portion of the second number of portions (e.g., memory size or footprint) (e.g., an unbalanced or asymmetrical structure).

In some examples, the first search, the second search, and the third search are binary searches. In some examples, the searches may include sequential search (e.g., a linear search) or interval searches (e.g., a logarithmic search).

Note that details of the processes described above with respect to method 900 (e.g., FIG. 9) are also applicable in an analogous manner to the methods described herein. For example, method 1400 optionally includes one or more of the characteristics of the various methods described above with reference to method 900. For example, the tree structure of method 1400 can correspond to the search space of method 900. For brevity, these details are not repeated below.

Attention is now directed towards techniques for organizing databases. Such techniques are described with respect to writing data to a physical storage device. However, it should be recognized that other contexts can be used with techniques described herein. For example, a data structure re-organized without respect to writing data can use techniques described herein. In addition, some techniques optionally complement or replace other techniques for organizing databases.

Figure 10:
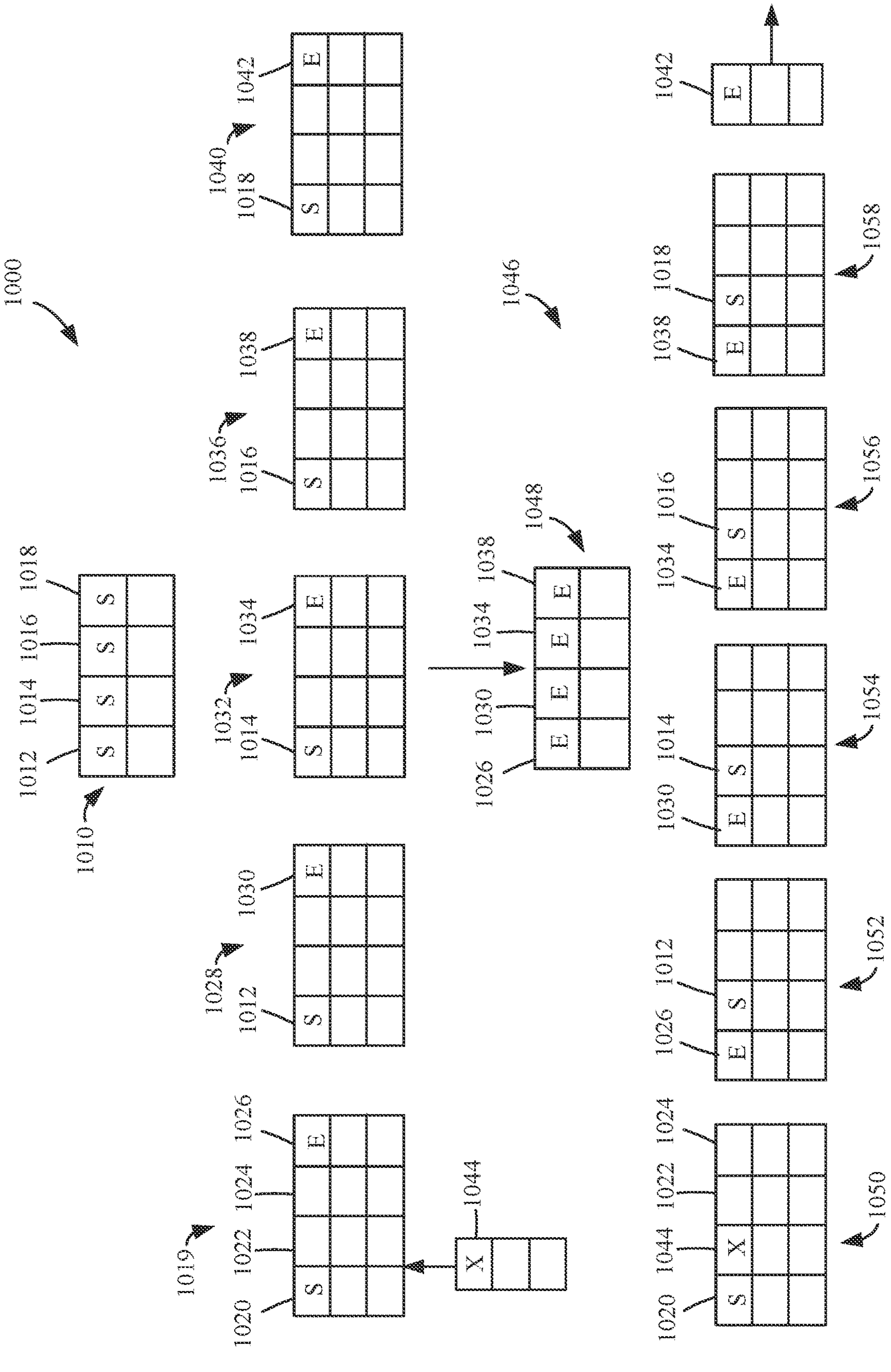
FIG. 10 is a block diagram illustrating a process for inserting an element into a data structure without void elements in accordance with some examples.

FIG. 10 is a block diagram illustrating a process of inserting an element (e.g., element 1044) into a data structure (e.g., tree 1000) without void elements in accordance with some examples. As illustrated, the data structure is a two-level tree before (e.g., represented as tree 1000) and after (represented as tree 1046) element 1044 is inserted.

In FIG. 10, tree 1000 includes root node 1010 and multiple leaf nodes (e.g., leaf node 1019, 1028, 1032, 1036, and 1040). Similarly, tree 1046 includes root node 1048 (which corresponds to root node 1010 after insertion of element 1044) and multiple leaf nodes (e.g., leaf node 1050 (which corresponds to leaf node 1019 after insertion of element 1044), leaf node 1052 (which corresponds to leaf node 1028 after insertion of element 1044), leaf node 1055 (which corresponds to leaf node 1032 after insertion of element 1044), lead node 1056 (which corresponds to leaf node 1036 after insertion of element 1044), and leaf node 1058 (which corresponds to leaf node 1040 after insertion of element 1044)). The differences in tree 1000 and tree 1046 will be discussed below, but it should be recognized that tree 1046 is tree 1000 after adding element 1044 to tree 1000.

While illustrated as a tree data structure, the process described below can be used for other types of data structures, such as a linear, graph, or hash data structure. In some examples the data structure can manage storage in a database (e.g., a physical storage device) as described above. In such examples, the configuration of the database can be the same as database 300 of FIG. 3 or database 400 of FIG. 4. In some examples, the configuration of the database can be some other configuration. In some examples, the data structure resulting from the process of FIG. 10 can be used for techniques described above, such as the searching techniques described with respect to FIGS. 5, 7, 8, and/or 9.

Referring to tree 1000, root node 1010 includes multiple elements (e.g., elements 1012, 1014, 1016, and 1018). Such elements can represent branch or leaf nodes of root node 1010. For example, element 1012 of root node 1010 can reference an element (e.g., element 1012 and/or 1030) in leaf node 1028, allowing a search of elements in root node 1010 to identify a leaf node. In such an example, element 1012 of root node 1010 can reference a first element in leaf node 1028 such that, when searching root node 1010 for a search query, leaf node 1019 results from identifying that the search query is less than element 1012, and leaf node 1028 results from identifying that the search query is equal to or more than element 1012 but less than element 1014 (e.g., as illustrated adjacent to element 1012 in root node 1010). Taking this example further, root node 1010 includes four different elements (e.g., elements 1012, 1014, 1016, and 1018), allowing a search as described above to result in identifying one of five different nodes. It should be recognized that other organizations can be used, such as element 1012 of root node 1010 can be located in the beginning of leaf node 1019 so that element 1012 is a minimum reference with respect to leaf nodes 1020-1040.

Referring to tree 1000, a leaf node (e.g., leaf nodes 1019, 1028, 1032, 1036, and/or 1040) includes one or more elements (e.g., elements 1020, 1022, 1024, and 1026 with respect to leaf node 1019) (sometimes referred to as a data element to distinguish from a void element). In some examples, an element is any type of data, including a set of bits, a pointer, a string, a number, and/or the like. For example, an element can include a key (e.g., a unique value to represent the element) and a value (e.g., data corresponding to the element).

As mentioned above, tree 1000 does not include any void elements (sometimes referred to as being a fully packed tree and/or fully packed set of one or more nodes). In some examples, void elements include portions of a data structure (e.g., tree 1000) that are unused, empty, blank, voided, and/or not used by the data structure. In such examples, tree 1000 not including any void elements represents that all elements in tree 1000 include data that is used by tree 1000. In some examples, when no void elements are present, adding additional elements to tree 1000 requires either deleting an existing element and/or making tree 1000 larger (e.g., take up more memory to fit the additional elements).

Referring to tree 1000, FIG. 10 illustrates element 1044 (e.g., a data element) being inserted between element 1020 and element 1022 in leaf node 1019. In some examples, data element 1044 is inserted between element 1020 and element 1022 in leaf node 1019 due to a key, value, and/or reference corresponding to element 1044 being greater than element 1020 and less than element 1022. In such examples, elements greater than element 1044 (e.g., elements 1022, 1024, 1026, 1012, 1014, 1016, and/or 1018) are shifted (e.g., to the right), moved, and/or re-ordered to make room for element 1044, as illustrated in tree 1046 and described below.

As mentioned above, tree 1046 is tree 1000 after adding element 1044 to tree 1000. As illustrated in FIG. 10, tree 1046 includes root node 1048 that includes different elements than root node 1010. For example, root node 1048 includes elements 1026, 1030, 1034, and 1038. These elements contrast with root node 1010 that includes elements 1012, 1014, 1016, and 1018. In some examples, root node 1048 includes different elements due to leaf nodes 1052, 1054, 1056, and 1058 including different initial elements than leaf nodes 1028, 1032, 1036, and 1040. In such examples, while leaf node 1028 included element 1012 in an initial position of leaf node 1028 in tree 1000, tree 1046 has leaf node 1052 with element 1026 (e.g., shifted from a different leaf node, such as leaf node 1019) in an initial position of leaf node 1052 and element 1012 in a position adjacent to element 1026 after insertion of element 1044. Similarly, due to elements of leaf nodes of tree 1046 being shifted to the right, elements 1030, 1034, 1038 of leaf nodes 1054, 1056, and 1058 are in initial positions of their respective leaf nodes, resulting in root node 1048 including elements 1030, 1035, and 1038 to point to initial positions of each leaf node.

FIG. 10 also illustrates that element 1042 is no longer in leaf node 1058 (e.g., corresponding to leaf node 1040) and is now shifted to another location. In some examples, element 1042 is added to a different leaf node, resulting in (1) root node 1048 adding an additional element to point and/or reference to the different leaf node or (2) a different root node being used to point and/or reference a leaf node including element 1042. In some examples, such re-organization of tree 1000 to tree 1046 is not optimal as it requires more space to be taken up by tree 1046 than tree 1000 and/or more processing or re-organization to result in tree 1046 than as compared to FIG. 11 as discussed below.

FIG. 11 is a block diagram illustrating a process of inserting an element (e.g., element 1162) into a data structure (e.g., tree 1100) with void elements (e.g., elements 1126, 1132, 1140, 1148, and 1158) (e.g., as described above in relation to FIG. 11) in accordance with some examples. Similar to FIG. 10, the data structure of FIG. 11 is a two-level tree before (e.g., represented as tree 1100) and after (represented as tree 1164) element 1162 is inserted.

Figure 11:
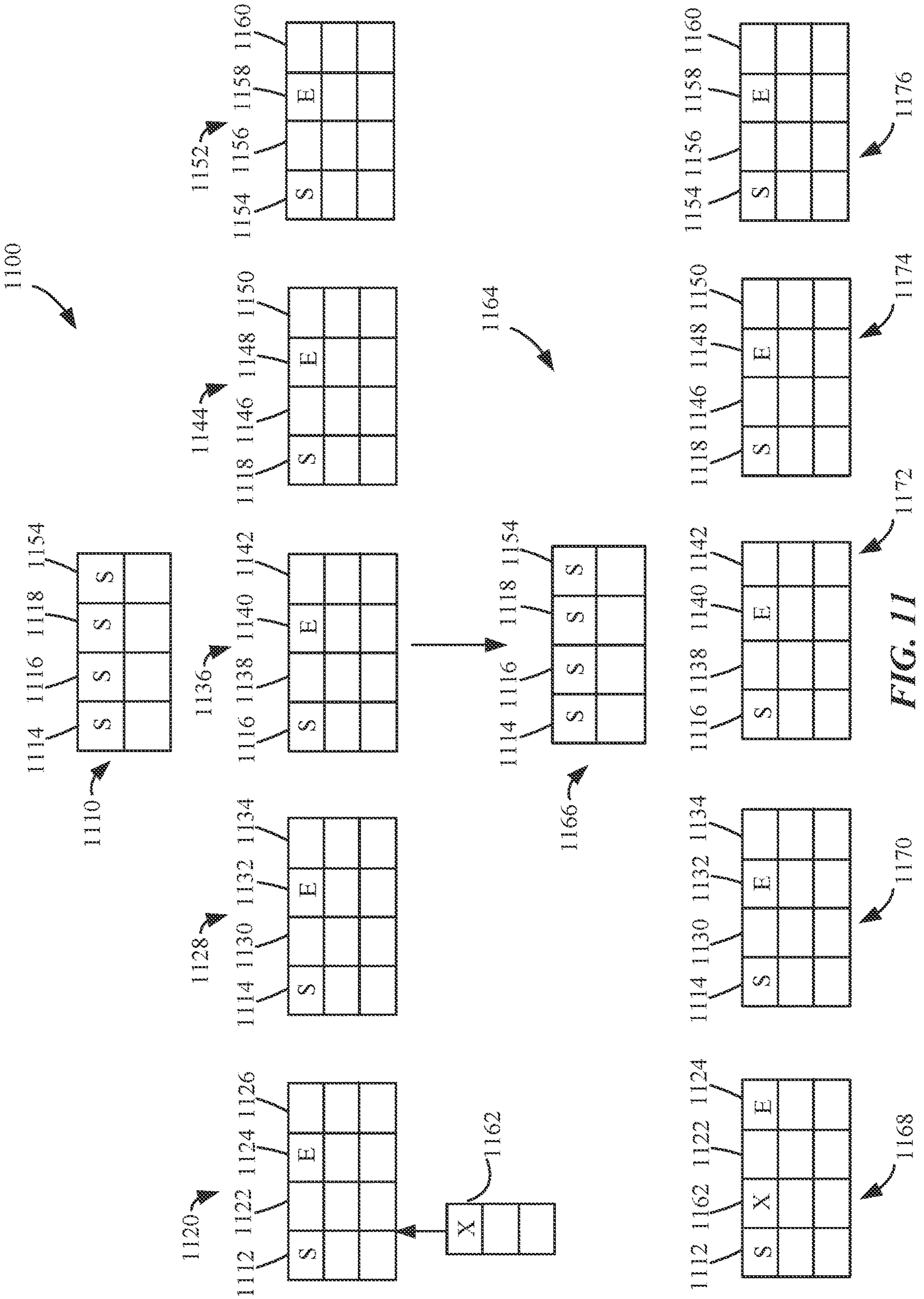
FIG. 11 is a block diagram illustrating a process for inserting an element into a data structure with void elements in accordance with some examples.

In FIG. 11, tree 1100 includes root node 1110 and multiple leaf nodes (e.g., leaf nodes 1120, 1128, 1136, 1144, and 1152). Similarly, tree 1164 includes root node 1166 (which corresponds to root node 1110 after insertion of element 1162) and multiple leaf nodes (e.g., leaf node 1168 (which corresponds to leaf node 1120 after insertion of element 1162), leaf node 1170 (which corresponds to leaf node 1128 after insertion of element 1162), leaf node 1172 (which corresponds to leaf node 1136 after insertion of element 1162), leaf node 1174 (which corresponds to leaf node 1144 after insertion of element 1162), and leaf node 1176 (which corresponds to leaf node 1152 after insertion of element 1162)). The differences in tree 1100 and tree 1164 will be discussed below but it should be recognized that tree 1164 is tree 1100 after adding element 1162 to tree 1100.

While illustrated as a tree data structure, the process described below can be used for other types of data structures, such as a linear, graph, or hash data structure. In some examples the data structure can manage storage in a database (e.g., a physical storage device) as described above. In such examples, the configuration of the database can be as illustrated in FIG. 3, FIG. 4, or some other configuration. In some examples, the data structure resulting from the process of FIG. 11 can be used for techniques described above, such as the searching techniques described with respect to FIGS. 5, 7, 8, and/or 9.

Referring to tree 1100, root node 1110 includes multiple elements (e.g., elements 1114, 1116, 1118, and 1154). Similar to as described above with respect to FIG. 10, such elements can represent branch or leaf nodes of root node 1110. For example, element 1114 of root node 1110 can reference an element in leaf node 1128, allowing a search of elements in root node 1110 to identify a leaf node. In such an example, element 1114 of root node 1110 can reference a first element in node 1128 such that, when searching root node 1110 for a search query, leaf node 1120 results from identifying that the search query is less than element 1114, and leaf node 1128 results from identifying that the search query is equal to or more than element 1114 but less than element 1116 (e.g., as illustrated adjacent to element 1114 in root node 1110). It should be recognized that other organizations can be used, such as element 1114 of root node 1110 can be located in the beginning of leaf node 1120 so that element 1114 is a minimum reference with respect to leaf nodes 1120-1152.

Referring to tree 1100, a leaf node (e.g., leaf nodes 1120, 1128, 1136, 1144, and/or 1152) includes one or more elements (e.g., elements 1112, 1122, 1124, and 1126 with respect to leaf node 1120). In some examples, zero or more of the one or more elements are data elements and zero or more of the one or more elements are void elements. In such examples, a data element is any type of data of a data structure (e.g., tree 1100), including a set of bits, a pointer, a string, a number, and/or the like, and a void element is a portion of the data structure that is unused, empty, blank, voided, and/or not used by the data structure. For example, a data element can include a key (e.g., a unique value to represent the element) and a value (e.g., data corresponding to the element), and a void element can be a default value for a general void element.

The presence of one or more void elements is sometimes referred to as not being a fully packed tree and/or not a fully packed set of one or more nodes). In some examples, when a void element is present, adding additional data elements to tree 1100 does not require deleting an existing data element and/or making tree 1100 larger (e.g., take up more memory to fit the additional data elements). Instead, a void element is replaced with a data element to make room for the additional data element as described further below.

In some examples, a leaf node does not include a void element but an adjacent leaf node of the leaf node includes a void element. In such examples, the void element in the adjacent leaf node can be shifted (e.g., to the right and/or to the left depending on which direction the adjacent leaf node is with respect to the leaf node (e.g., moved to the right if the adjacent leaf node is to the right and moved to the left if the adjacent leaf node is to the left), moved, and/or re-ordered to have the void element included in the leaf node and be able to replaced by a data element to make room in the leaf node for the additional data element. Such shifting can be similar to as described above with respect to FIG. 10 and is described further below.

Referring to tree 1100, FIG. 11 illustrates element 1162 (e.g., a data element) being inserted between element 1112 and element 1122 in leaf node 1120. In some examples, element 1162 is inserted between element 1112 and element 1122 in leaf node 1120 due to a key, value, and/or reference corresponding to element 1162 being greater than element 1112 and less than element 1122. In such examples, if leaf node 1120 includes a void element (e.g., void element 1126), one or more data elements in leaf node 1120 are shifted (e.g., to the right), moved, and/or re-ordered to remove the void element and make room in leaf node 1120 for element 1162.

As mentioned above, tree 1164 is tree 1100 after adding element 1162 to tree 1100. As illustrated in FIG. 11, tree 1164 includes root node 1166 that includes the same elements as root node 1010. In some examples, root node 1166 includes the same elements due to leaf node 1120 including a void element that can be removed to make room for element 1162. In such examples, root node 1166 remains the same because leaf nodes 1170 (corresponding to leaf node 1128), 1172 (corresponding to leaf node 1136), 1174 (corresponding to leaf node 1144), and 1176 (corresponding to leaf node 1152) (e.g., the leaf nodes used as references for root node 1166) include the same initial elements as leaf nodes 1128, 1136, 1144, and 1152. It should be recognized that a similar result (e.g., root node 1166 not changing) would be caused if a single data element was added to leaf node 1128, 1136, 1144, and/or 1152 because a void element in each leaf node can be deleted to make room for the single data element.

While root node 1166 is not different from root node 1110 as a result of adding element 1162 to tree 1100, leaf node 1168 is changed relative to leaf node 1120. For example, element 1162 is inserted into the second position of leaf 1168 (e.g., as a result of element 1162 being greater than element 1112 and less than element 1122). As a result of element 1162 being inserted into the second position of leaf 1168, elements 1122 and 1124 are shifted to the right such that element 1122 is in the third position of leaf 1168 and element 1124 is in the fourth position of leaf 1168 (which previously, in leaf 1120, included void element 1126). It should be recognized that other re-organizations of leaf node 1120 can occur depending on the scheme and where element 1162 fits within leaf node 1168 but that root node 1166 should not be modified when there are available void elements in an affected leaf node (e.g., a leaf node for which a new element is being added). In some examples, shifting elements 1122 and 1124 within leaf node 1168 as opposed to shifting a root node and/or other leaf nodes (as described above with respect to FIG. 10) is a more favorable outcome.

In some examples, additional data elements can be added to a leaf node that is fully packed (e.g., leaf node 1168). In such examples, an adjacent leaf node with a void element resulting in the least amount of movement and/or changes can be identified and used for adding the additional data elements. For example, if two additional data elements are to be added to leaf node 1174 after element 1146 and before 1148, only one of the two additional data elements would fit into leaf node 1174 as illustrated in FIG. 11 due to there only being a single void element in leaf node 1174. In such an example, leaf nodes 1172 and/or 1176 can be identified as adjacent leaf nodes to leaf node 1174, and leaf node 1176 can be identified as requiring the least amount of changes because moving void element 1160 to leaf node 1174 would result in changes to root node 1166 (e.g., element 1154 of root node 1166 would be replaced with data element 1148) and leaf nodes 1174 (e.g., elements 1148 and 1150 of leaf node 1174 would be replaced with the additional data elements) and 1176 (e.g., elements 1154, 1156, 1158, and 1160 would be shifted to the right to make room for element 1148 in the first position of leaf node 1176) as opposed to moving void element 1142 of leaf node 1172 would result in changes to root node 1166 (e.g., elements 1118 and 1154 of root node 1166 would be replaced with elements 1146 and 1156) and leaf nodes 1172 (e.g., void element 1142 of leaf node 1172 would be replaced with data element 1118) and 1174 (e.g., element 1118 of leaf node 1174 would be replaced with element 1146 and element 1148 would be shifted to the right to the fourth position of leaf node 1174 to make room for the two additional data elements between element 1146 and data element 1148 in leaf node 1174). In other examples, leaf nodes to the right are examined before a leaf node to the left to reduce the number of changes made. In other examples, leaf nodes to the right and leaf nodes to the left are examined in alternating fashion starting with leaf nodes to the right (e.g., examine a leaf node to the right, then a leaf node to the left, then a leaf node to the right, then a leaf node to the left, etc. until enough void elements are identified). It should be recognized that different combinations of void elements from different leaf nodes can also be used to make room for additional data elements.

In some examples, to avoid the situation illustrated in FIG. 10 and/or described in the previous paragraph when there are not sufficient void elements for adding additional data elements, techniques described below with respect to FIGS. 12-14 can be used. Such techniques are sometimes referred to as void distribution and include the distribution of void elements to one or more parts of a data structure before needing to move void elements to make room for an additional data element. In such examples, void distribution can ensure that enough void elements are present within a portion of a data structure (e.g., at a terminal location (e.g., end) of the tree and/or a leaf of a tree that needs additional void elements) to accommodate new requests to add data (e.g., requests to update a database as opposed to a request to search the database). In some examples, void distribution includes one or more steps, including (1) addition of a set of void elements (e.g., in the context of a tree, the set of void elements is something referred to as a full void leaf (FVL) (e.g., a leaf node consisting of void elements) (e.g., a leaf node including void elements and not including data elements as described above)) into the data structure and/or (2) distribution of void elements to parts (e.g., in the context of a tree, into leaf nodes) of the data structure. As further discussed below, such techniques (e.g., addition of sets of void elements and/or distribution of void elements into particular parts) can occur during an idle time of a computer system on which (1) such techniques are performed and/or (2) such data is stored.

Figure 12:
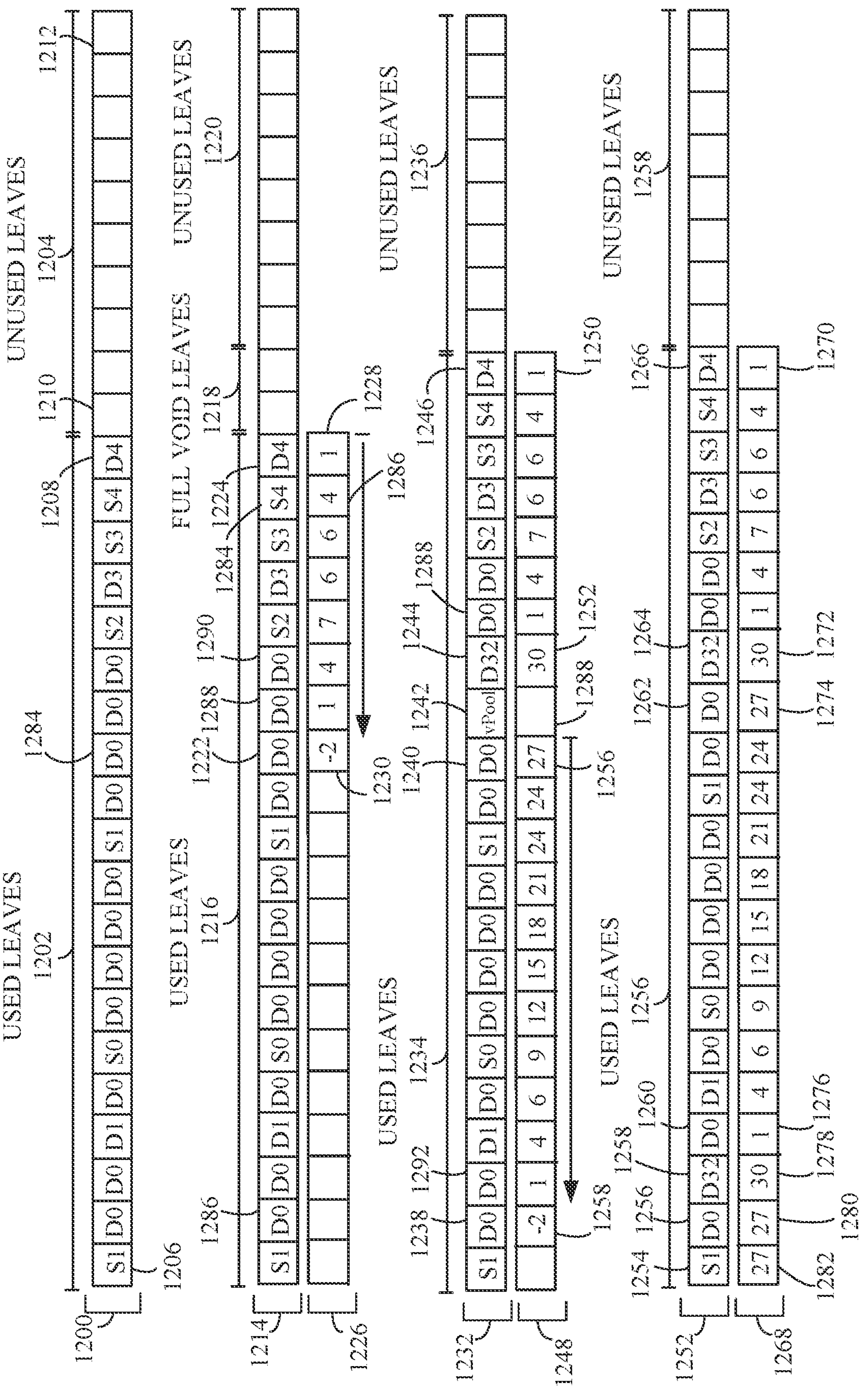
FIG. 12 is a block diagram illustrating a process for adding void elements to a data structure in accordance with some examples.

FIG. 12 is a block diagram illustrating a process of adding void elements (e.g., sets of void elements, sometimes referred to as full void leaves (FVLs)) to a data structure (e.g., a tree, such as illustrated above with respect to FIGS. 5, 7, 8, 10, and/or 11) in accordance with some examples. The process of FIG. 12 includes four different steps, each step illustrated using a different representation of leaf nodes of a tree. The first step of the process of FIG. 12 is illustrated by representation 1200 and includes determining whether one or more sets of void elements should be added to a tree. The second step of the process of FIG. 12 is illustrated by representations 1214 and 1226 and includes adding one or more sets of void elements and determining where in the tree to distribute the one or more sets of void elements. The third step of the process of FIG. 12 is illustrated by representations 1232 and 1248 and includes moving at least one of the sets of void elements to a location within the tree and continuing to determine where in the tree to distribute remaining sets of void elements. The fourth step of the process of FIG. 12 is illustrated by representations 1252 and 1268 and includes moving the remaining sets of void elements to their final locations. It should be recognized that more or fewer steps can be used to accomplish the results illustrated in representation 1252. In addition, in some examples, such steps are not all finished before stopping, as described further below.

As mentioned above, the first step of the process of FIG. 12 is illustrated by representation 1200 and includes determining whether one or more sets of void elements should be added to the tree. As illustrated, representation 1200 includes a portion of used leaves (e.g., used leaves 1202) and a portion of unused leaves (e.g., unused leaves 1204). In some examples, used leaves 1202 refer to a portion of memory corresponding to the tree and/or that are being used by the tree. For example, a used leaf of used leaves 1202 can correspond to leaves 1120, 1128, 1136, 1144, and/or 1152 of FIG. 11. In such examples, portions of memory outside of the portion (e.g., unused leaves 1204) do not correspond to the tree and/or are not used by the tree. In some examples, portions of memory outside of the portion correspond to leaf nodes that have been provided to the tree but that are currently unused by the tree (e.g., nodes of the tree do not point and/or refer to unused leaves). It should also be recognized that unused leaves can be, in some examples, unused memory that is not explicitly split into different leaves and instead can be used when adding sets of void elements to the tree.

Referring to representation 1200, used leaves 1202 include multiple leaves (e.g., leaves 1206, 1284. and/or 1208), and unused leaves 1204 include multiple leaves (e.g., leaves 1210 and/or 1212). In representation 1200, there are 20 used leaves and 10 unused leaves. It should be recognized that there can be more or fewer used leaves and/or unused leaves (including a single used and/or a single unused leaf).

As illustrated, each used leaf in used leaves 1202 of representation 1200 includes a letter and a number. The letter refers to whether a used leaf is static (uses "S") or dynamic (uses "D"). In some examples, a static node is a leaf node that has not been updated for a predefined amount of time. In some examples, a dynamic node is a leaf node that has been updated within the predefined amount of time. In representation 1200, there are 6 static nodes and 14 dynamic nodes. The number following the letter refers to number of void elements in a leaf node. For example, leaf node 1206 is a static leaf node with 1 void element.

For the first step, multiple calculations can be performed to determine whether one or more sets of void elements should be added to the tree.

One calculation can include calculating a number of void elements expected for the tree. The equation for the number of void elements expected for the tree can be (BST_VOIDS_IN_DYNAMIC*(numLeaves−numStats)+ BST_VOIDS_IN_STATIC numStats)), where BST_VOIDS_IN_DYNAMIC is the number of void elements required in a dynamic node, numLeaves is the number of leaves in the tree, numStats is the number of static nodes in the tree, and BST_VOIDS_IN_STATIC is the number of void elements required in a static node. In the example depicted in FIG. 12, BST_VOIDS_IN_DYNAMIC can be 3 and BST_VOIDS_IN_STATIC can be 1, resulting in the number of void elements expected in the tree being 52 for representation 1200.

Another calculation can include calculating a number of void elements needed for the tree. The equation for the number of void elements needed can be the number of void elements expected for the tree (e.g., the previous equation) minus the number of void elements in the tree. In the example depicted in FIG. 12, the number of void elements in the tree can be 19 (e.g., adding up the numbers next to each letter for each leaf node in used leaves 1202), resulting in the number of void elements needed being 33 for representation 1200.

Another calculation can include calculating the number of sets of void elements (e.g., FVLs) needed for the tree. The equation for the number of sets of void elements needed for the tree can be the result rounded up of the number of void elements needed for the tree (e.g., the previous equation) divided by the number of entries (e.g., the number of elements in a leaf node minus the number of void elements required in a dynamic node, or, in some examples, just the number of leaf elements in a leaf nodes). In the example depicted in FIG. 12, the number of sets of void elements needed for the tree can be 2, resulting from 33/*(32−3)=1.13=2.

As mentioned above, the second step of the process of FIG. 12 is illustrated by representations 1214 and 1226 and includes adding one or more sets of void elements and determining where in the tree to distribute the one or more sets of void elements.

For adding the one or more sets of void elements, the equations discussed above can be used, resulting in two sets of void elements added to the tree. In some examples, the void elements are added to a particular location in the tree (e.g., beginning, end, middle, and/or dispersed (e.g., evenly or not evenly) within the tree). As illustrated in FIG. 12, representation 1214 includes two sets of void elements at the end of the tree (e.g., full void leaves 1218). In some examples, the two sets of void elements are taken from unused leaves 1204 such that unused leaves 1220 in representation 1214 is now smaller by two leaves.

For determining where to distribute the one or more sets of void elements in the tree, a summation equation can be used with respect to each leaf node in used leaves 1216 of representation 1214. The summation equation can include going from one leaf node to another leaf until identifying a location in which additional void elements are needed. In one example, the summation equation can be the summation of the difference of number of void elements in every previous leaf element by the required number of void elements for the particular type of leaf node. For example, leaf node 1224 of representation 1214 can be a dynamic leaf node with four void elements, and, if starting with right-most leaf node and based on the number of void elements required in a dynamic node described above, the summation equation would result in 4−3=1 (as shown in field 1228 of representation 1226). Continuing the example, leaf node 1284 of representation 1214 can be a static leaf node with four void elements and, based on the number of void elements required in a static node described above, the summation equation would result in 1+(4−1)=4 (as shown in field 1286 of representation 1226). As long as the summation equation continues to be above a threshold (e.g., positive and/or some other threshold), it can be determined that additional void elements are not needed. Accordingly, at leaf node 1222 of representation 1214, the summation equation can equal −2, indicating that additional void elements are needed based on it being below the threshold (e.g., a negative number). Based on the summation equation equaling −2, leaf node 1222 of representation 1213 can be determined to be the location in which additional void elements are needed.

As mentioned above, the third step of the process of FIG. 12 is illustrated by representations 1232 and 1248 and includes moving at least one of the sets of void elements to a location within the tree and continuing to determine where in the tree to distribute remaining sets of void elements. In some examples, the remaining sets of void elements are moved with the other sets of void elements so that further movement of the remaining sets of void elements is shorter. In other examples, the remaining sets of void elements are not moved until a location for them is identified.

For moving at least one of the sets of void elements to a location within the tree, the location can correspond to the location determined in the second step of the process of FIG. 12 (e.g., leaf node 1222 of representation 1214). As a result of identifying leaf node 1222 of representation 1214, one or more sets of void elements can be moved before leaf node 1222 (e.g., at a location corresponding to where leaf node 1222 was located in representation 1214) as a dynamic node. As illustrated in FIG. 12, leaf node 1244 of representation 1232 has been added before leaf node 1240 of representation 1232 (e.g., which corresponds to leaf node 1222 in representation 1214) and after leaf node 1288 (e.g., which corresponds to leaf node 1288 in representation 1214). In some examples, in addition to adding leaf node 1244 to representation 1232, leaf node 1242 (and/or one or more other sets of void elements) can be moved after leaf node 1244 and maintain that location until needed to be moved again when the summation equation is below a threshold. In other examples, leaf node 1242 (and/or one or more other sets of void elements) can stay where it was added to the tree (e.g., as illustrated by full void leaves 1218 in representation 1214). As illustrated in FIG. 12, adding leaf nodes 1244 and 1242 to used leaves 1216 causes (1) used leaves 1216 to become two larger and unused leaves 1236 to become 2 smaller and (2) leaf nodes in used leaves 1216 of representation 1214 to be shifted to the right to make room for leaf nodes 1244 and 1242.

For continuing to determine where to distribute remaining sets of void elements in the tree, the summation equation can continue to be used similar to as described above with respect to representation 1214 and 1226. For example, leaf node 1244 of representation 1232 can be a dynamic leaf node with 32 void elements (e.g., a full void leaf0 and, based on the number of void elements required in a dynamic node described above, the summation equation would result in 1+(32−3)=30 (as shown in field 1288 of representation 1248). As long as the summation equation continues to be above the threshold, it can be determined that additional void elements are not needed. Accordingly, at leaf node 1240 of representation 1232 after skipping leaf node 1242 because it is not counted in the summation equation, the summation equation can equal 27 (30+(0−3)=27), which is above the threshold. Continuing to leaf node 1238 of representation 1248, the summation equation can return −2, indicating that additional void elements are needed based on it being below the threshold. Based on the summation equation equaling −2, leaf node 1238 of representation 1232 can be determined to be the location in which additional void elements are needed.

As mentioned above, the fourth step of FIG. 12 is illustrated by representations 1252 and 1268 and includes moving the remaining sets of void elements to their final locations. Such moving can include moving leaf node 1242 of representation 1232 before leaf node 1238 (e.g., at a location corresponding to where leaf node 1238 was located in representation 1232) as a dynamic node. As illustrated in FIG. 12, leaf node 1258 of representation 1252 has been added before leaf node 1256 of representation 1252 (e.g., which corresponds to leaf node 1238 in representation 1232) and after leaf node 1260 (e.g., which corresponds to leaf node 1292 in representation 1232). As illustrated in FIG. 12, moving leaf node 1258 does not cause (1) used leaves 1220 to become larger, (2) unused leaves 1236 to become smaller, and/or (3) leaf nodes in used leaves 1234 of representation 1232 to be shifted to the right. In some examples, if there are more sets of void elements in the tree, one or more sets of void elements can be moved after leaf node 1258 as described above with respect to leaf node 1242 in representation 1232. In some examples, if there are no sets of void elements in the tree, no additional sets of void elements are moved and the process ends. In other examples, one or more sets of void elements are added to the tree if the summation equation continues and identifies other leaf nodes that need sets of void elements.

While particular equations are described above, it should be recognized that different equations can be used in some examples. For example, a number of void elements needed for each leaf node can be calculated and, when additional void elements are needed, a set of void elements can be added without respect to previous leaf elements.

In some examples, after distributing the sets of void elements to the tree, individual void elements can be added to leaf nodes with data elements (e.g., this process sometimes referred to as melding). In some examples, melding occurs from left to right in the tree and moves elements between leaf nodes, as illustrated and described with respect to FIGS. 13A-13I.

Figure 13A:
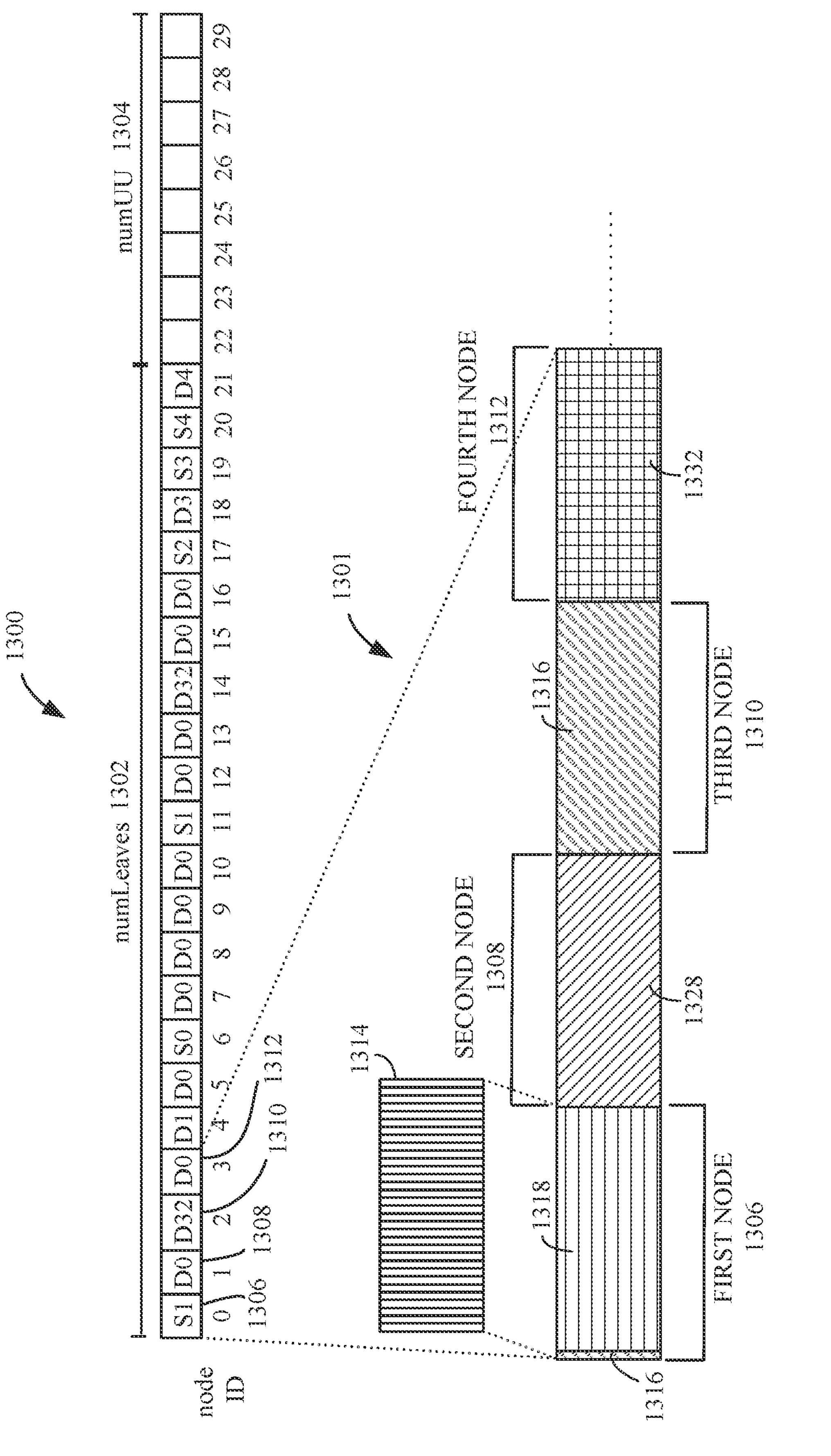
FIGS. 13A-13I are block diagrams illustrating a process for melding void elements into a data structure in accordance with some examples.

FIG. 13A illustrates a block diagram of data elements in multiple nodes of a tree in accordance with some examples. The block diagram of FIG. 13A includes a representation of leaf nodes of the tree (e.g., pointed to by reference number 1300 and corresponding to representation 1252 of FIG. 12). While the process described below with respect to FIGS. 13A-13I would apply to all leaf nodes in numLeaves 1302, the discussion focuses on a subset of the leaf nodes (e.g., leaf nodes 1306, 1308, 1310, and 1312) for sake of brevity. It should be recognized that similar operations would continue to be applied to other leaf nodes in numLeaves 1302.

The block diagram of FIG. 13A includes a zoomed view of each of the subset of the leaf nodes (e.g., pointed to by reference number 1301), including a representation of first node 1306, second node 1308, third node 1310, and fourth node 1312. The zoomed view of FIG. 13A uses different line patterns to represent where data elements originally came from (e.g., pattern 1318 corresponding to first node 1306), pattern 1328 corresponding to second node 1308, pattern 1316 corresponding to third node 1310, and pattern 1332 corresponding to fourth node 1312) and which elements are void elements (e.g., pattern 1316). While first node 1306 is illustrated in FIG. 13A as including pattern 1316, it should be recognized that the portion corresponding to pattern 1316 also originally came from first node 1306 but that one area can only include one pattern. FIGS. 13B-13I continue the above conventions in the description with respect to the zoomed version but no longer include representation 1300 to reduce what is illustrated. It should be recognized that the zoomed version still applied in FIGS. 13B-13I to representation 1300.

In some examples, the block diagrams of FIGS. 13A-13I include representations of how many individual data elements that are included in a leaf node (e.g., 1314 in FIG. 13A for first node 1306, 1330 in FIG. 13F for second node 1308, 1334 in FIG. 13H for third node 1310, and 1336 in FIG. 13I for fourth node 1312) in proximity to the zoomed view. Such representations are to be used to compare with the line patterns depicted in the zoomed view and were added for clarity as a result of size constraints. It should be recognized that the examples described with respect to FIGS. 13A-13I have 32 data elements for each leaf node.

Figure 13B:
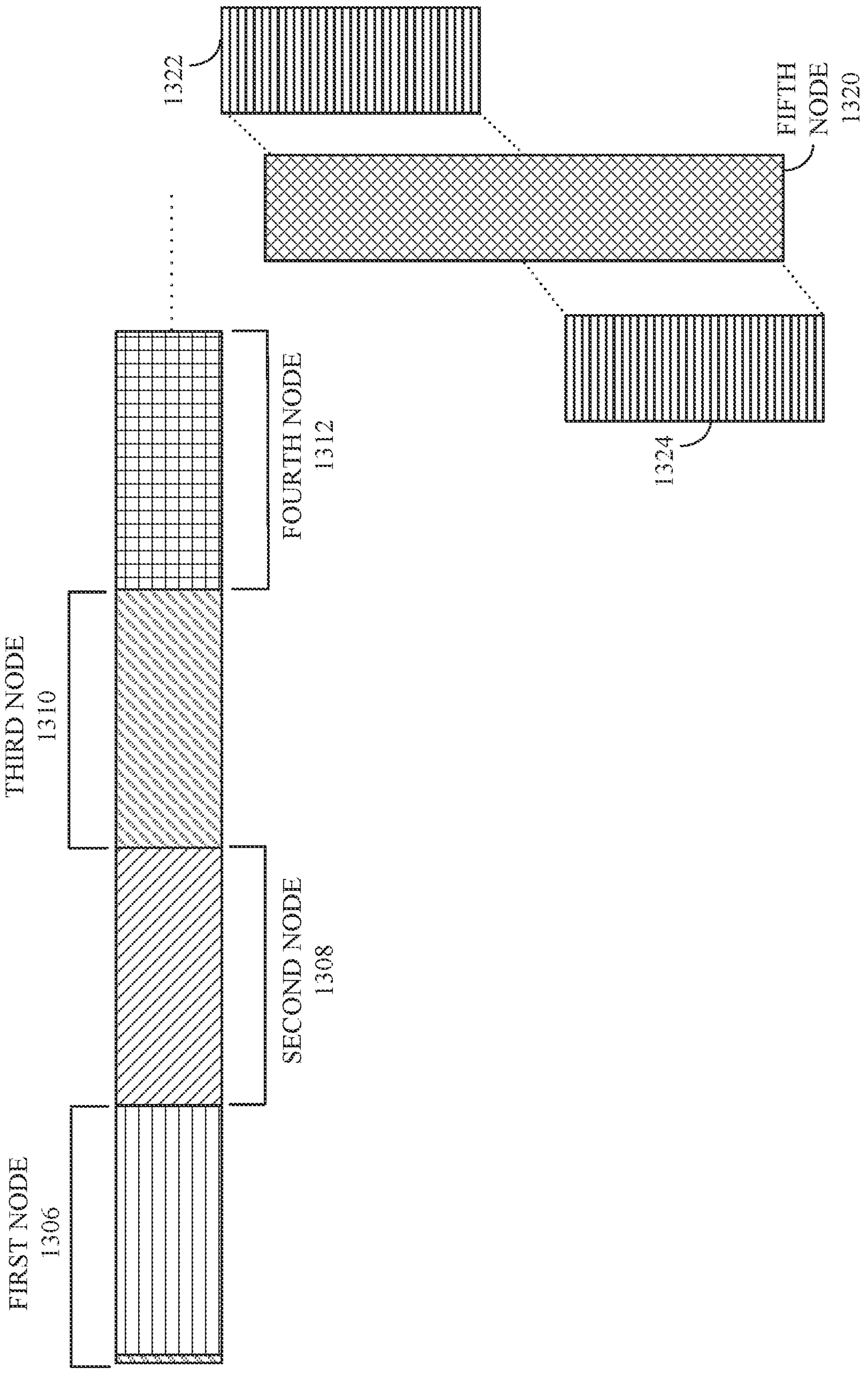

FIG. 13B illustrates another block diagram of data elements in multiple nodes of a tree in accordance with some examples. The block diagram in FIG. 13B includes representations of multiple leaf nodes (e.g., first node 1306, second node 1308, third node 1310, and fourth node 1312) at the part of a melding process, such as in the state illustrated in FIG. 13A.

The block diagram in FIG. 13B includes fifth node 1320. In some examples, fifth node 1320 is a queue used to transfer data elements between leaf nodes. In such examples, fifth node 1320 can be part of the tree and/or separate from the tree. It should be recognized that the queue might not be used and such movements can be performed in memory of first node 1306, second node 1308, third node 1310, and/or fourth node 1312. As illustrated, fifth node 1320 is the size of two nodes (e.g., 62 elements, represented by first subset 1322 with 32 elements and second subset 1324 with 32 elements). In some examples, fifth node 1306 can be smaller or larger. As illustrated in FIG. 13B, fifth node 1306 is empty at first (e.g., before iterating through the tree (e.g., starting at first node 1306), as illustrated in FIGS. 13C-13I).

Figure 13C:
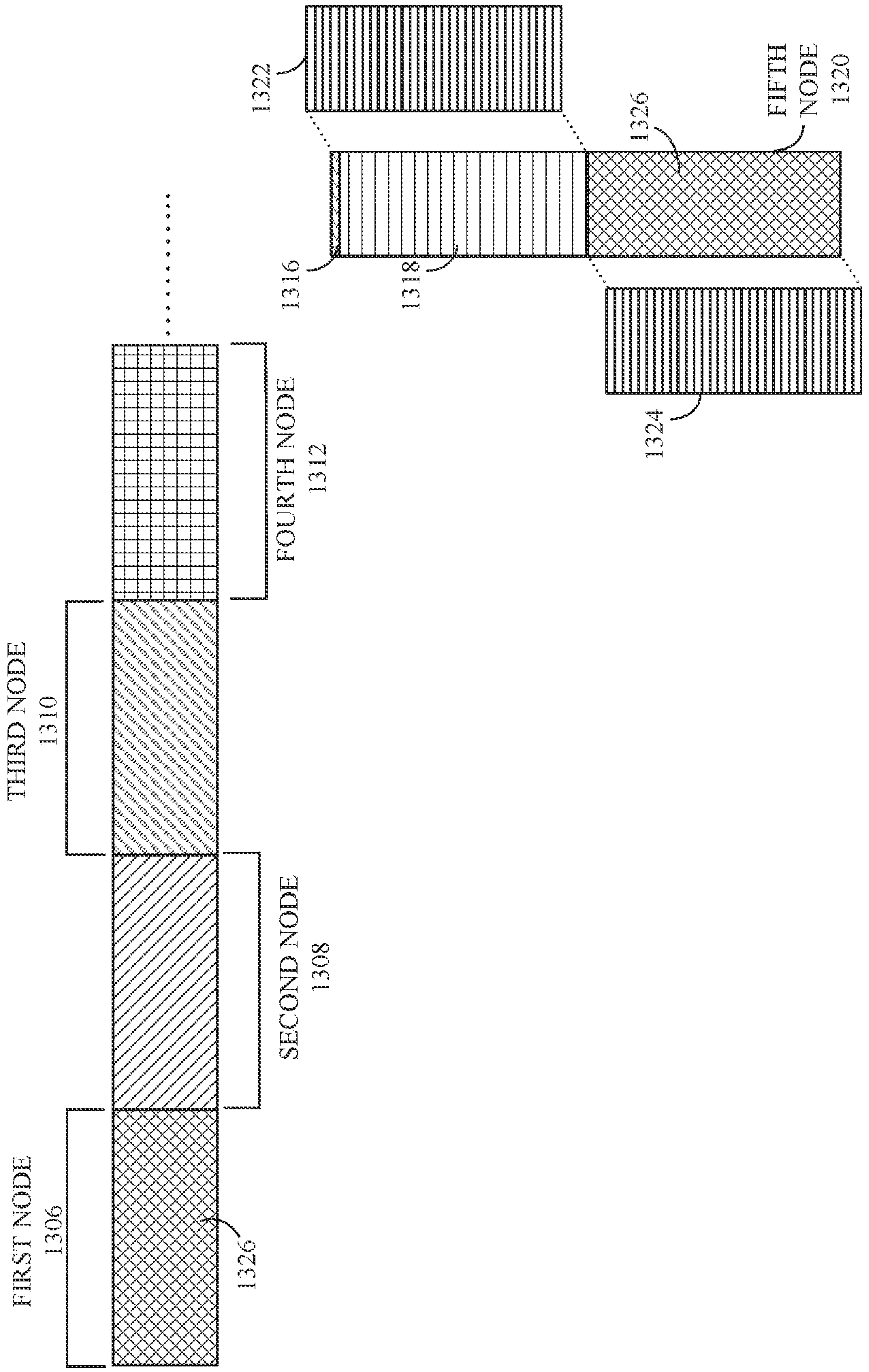

FIG. 13C illustrates a block diagram with elements from first node 1306 moved to fifth node 1320 in accordance with some examples. In some examples, FIG. 13C occurs after the state illustrated in FIG. 13B, such as when a melding process begins iterating over a set of leaf nodes starting at first node 1306.

As illustrated in FIG. 13C, first node 1306 is empty (e.g., elements (e.g., data elements and/or void elements) previously (e.g., in FIG. 13B) included in first node 1306 are no longer in first node 1306). In some examples, such elements corresponding to those previously included in first node 1306 have been moved to fifth node 1320, as illustrated by pattern 1316 being at the top (e.g., beginning) of fifth node 1320 and followed by a portion of pattern 1318 in the same order and amount as illustrated in first node 1306 in FIG. 13B. In some examples, void elements in first node 1306 are not moved to fifth node 1320 but instead cause void balance to increment (e.g., by one when one void element is included in first node 1306), as described further below.

FIG. 13C also illustrates that the rest of fifth node 1320 is empty (e.g., pattern 1326, the same pattern as first node 1306 in FIG. 13C) and that second node 1308, third node 1310, and fourth node 1312 have maintained the same pattern as illustrated in FIG. 13C (e.g., representing that nothing has occurred with respect to those nodes). It should be recognized that, in some examples, elements in first node 1306 are not moved to fifth node 1320 but rather copied such that elements in first node 1306 remain.

Figure 13D:
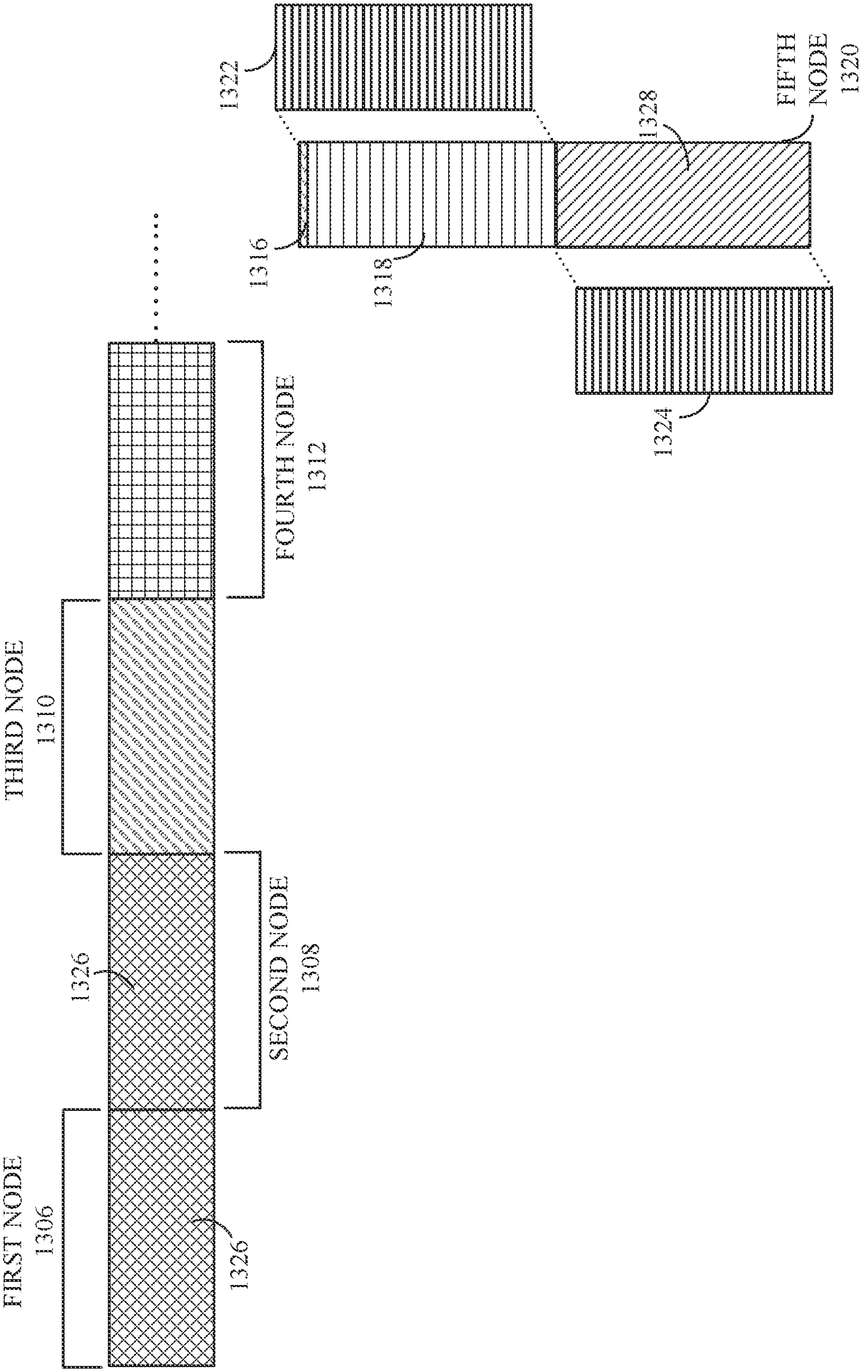

FIG. 13D illustrates a block diagram with elements from second node 1308 moved to fifth node 1320 in accordance with some examples. In some examples, FIG. 13D occurs after the state illustrated in FIG. 13C, such as after elements corresponding to first node 1306 have been moved to fifth node 1320. In such examples, FIG. 13D occurs as the melding process iterates over the nodes illustrated in FIG. 13B and progresses passed first node 1306. In some examples, the melding process moves elements back to first node 1306 (e.g., as illustrated and described with respect to FIG. 13E) before moving elements corresponding to second node 1308 to fifth node 1320.

As illustrated in FIG. 13D, first node 1306 and second node 1308 are empty (e.g., elements previously (e.g., in FIG. 13C) included in second node 1308 are no longer in second node 1308, as illustrated by pattern 1326 in second node 1308 in FIG. 13D). In some examples, such elements corresponding to those previously included in second node 1308 have been moved to fifth node 1320, as illustrated by pattern 1328 being below (e.g., after) elements corresponding to first node 1306 in fifth node 1320 in the same order and amount as illustrated in second node 1308 in FIG. 13C.

FIG. 13D also illustrates that first node 1306, third node 1310, and fourth node 1312 have maintained the same pattern as illustrated in FIG. 13C (e.g., representing that nothing has occurred with respect to those nodes). It should be recognized that, in some examples, elements in second node 1308 are not moved to fifth node 1320 but rather copied such that elements in second node 1308 remain.

Figure 13E:
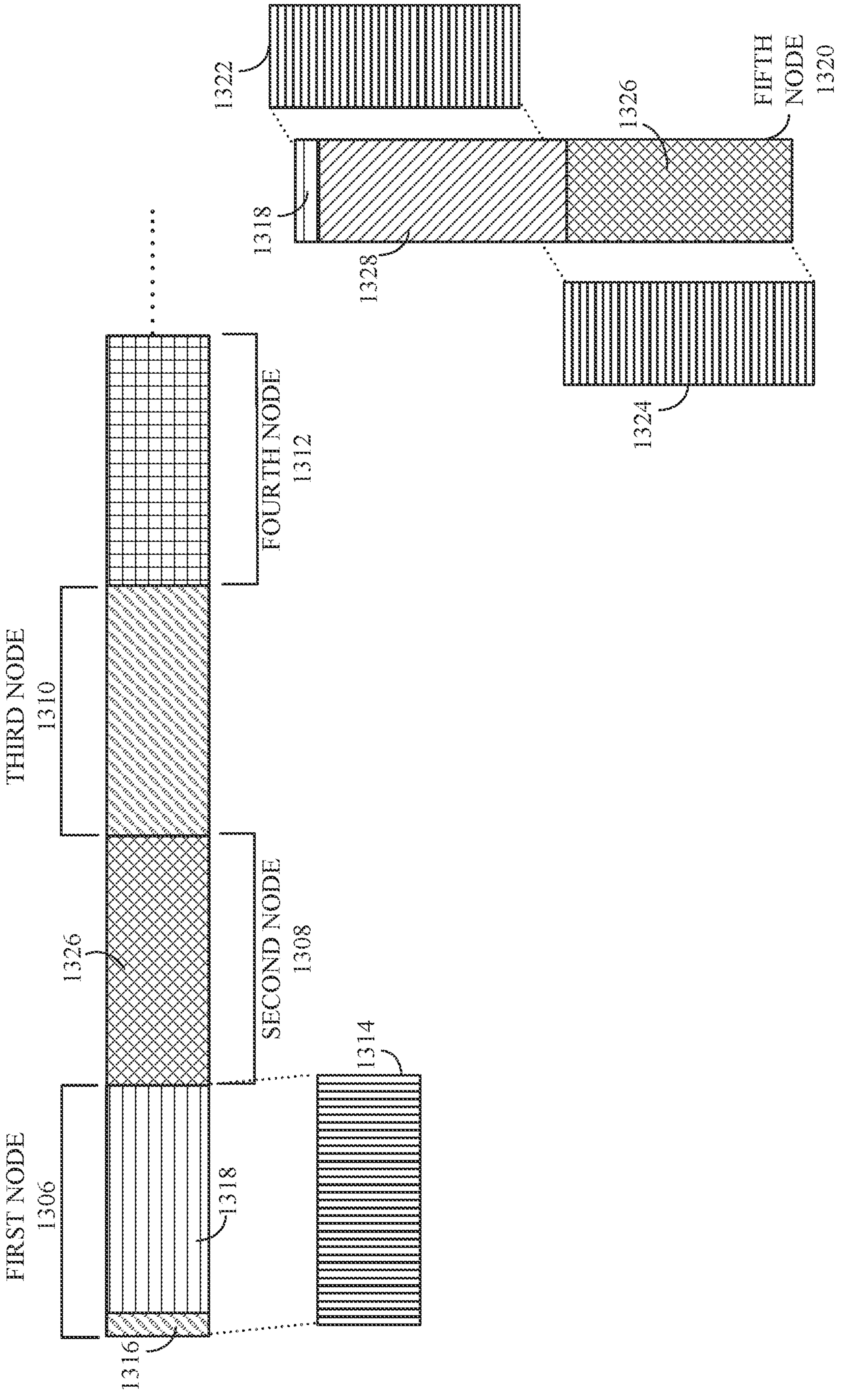

FIG. 13E illustrates a block diagram with elements from fifth node 1320 moved to first node 1306 in accordance with some examples. In some examples, FIG. 13E occurs after the state illustrated in FIG. 13D, such as after elements corresponding to second node 1308 have been moved to fifth node 1320. In such examples, FIG. 13E occurs as the melding process iterates over the nodes illustrated in FIG. 13D and progresses passed second node 1308. In some examples, operations resulting in difference of FIGS. 13D and 13E occur as a result of fifth node 1320 being filled (e.g., not including any additional empty space) and there not being enough void elements in fifth node 1320 to fill first node 1306, as described further below.

As illustrated in FIG. 13E, first node 1306 is no longer empty and includes a portion of elements (e.g., 30 elements) included in fifth 1320 in FIG. 13D. In some examples, such elements corresponding to those previously included in fifth node 1320 have been moved to first node 1306, as illustrated by pattern 1316 being at the left (e.g., beginning) of first node 1306 and followed by a portion of pattern 1318 in the same order as illustrated in fifth node 1320 in FIG. 13D.

It should be recognized that pattern 1316 in first node 1306 of FIG. 13E is larger (e.g., more) than pattern 1316 in fifth node 1320 in FIG. 13D and first node 1306 in FIG. 13B. In some examples, such difference is a result of determining that first node 1306 should have 3 void elements and that it previously only had 1 (e.g., only 1 void element was included in first node 1306 in FIG. 13B and fifth node 1320 in FIG. 13E). The determining can be based on a predefined threshold of void elements, a constant amount determined for each leaf element in the tree including first node 1306, or an amount determined specifically for first node 1306 (e.g., such as taking into account past, current, and/or future use related to first node 1306). In some examples, the addition of 2 void elements that were not previously included in fifth node 1320 (e.g., as of FIG. 13D) causes a void balance for the melding process to be at −2, representing that the melding process has used two void elements that it did not have and will need to make up for those later in the melding process. Before this point, because no void elements were added, the void balance was at 0.

As illustrated in FIG. 13E, fifth node 1320 includes pattern 1318 (corresponding to elements previously included in first node 1306 (e.g., in FIG. 13B)), pattern 1328 (corresponding to elements previously included in second node 1308 (e.g., in FIG. 13C)), and pattern 1326 (corresponding to empty elements as described above). In some examples, fifth node 1320 still include pattern 1318 because those elements were what were left over after filling (e.g., up to 32 elements) first node 306 after adding the determined number of void elements. In some examples, pattern 1318 and pattern 1328 are at the top (e.g., beginning) of fifth node 1320 because data elements corresponding to patterns before pattern 1318 and pattern 1328 in FIG. 13D have been popped (e.g., moved out) and now elements corresponding to pattern 1318 and pattern 1328 are at the beginning of fifth node 1320.

FIG. 13E also illustrates that second node 1308, third node 1310, and fourth node 1312 have maintained the same pattern as illustrated in FIG. 13D (e.g., representing that nothing has occurred with respect to those nodes). It should be recognized that, in some examples, elements in first node 1306 are not moved back and forth to fifth node 1320 but rather copied such that elements in fifth node 1320 corresponding to first node 1306 are shifted to the right to start taking up elements in second node 1308 in FIG. 13E.

Figure 13F:
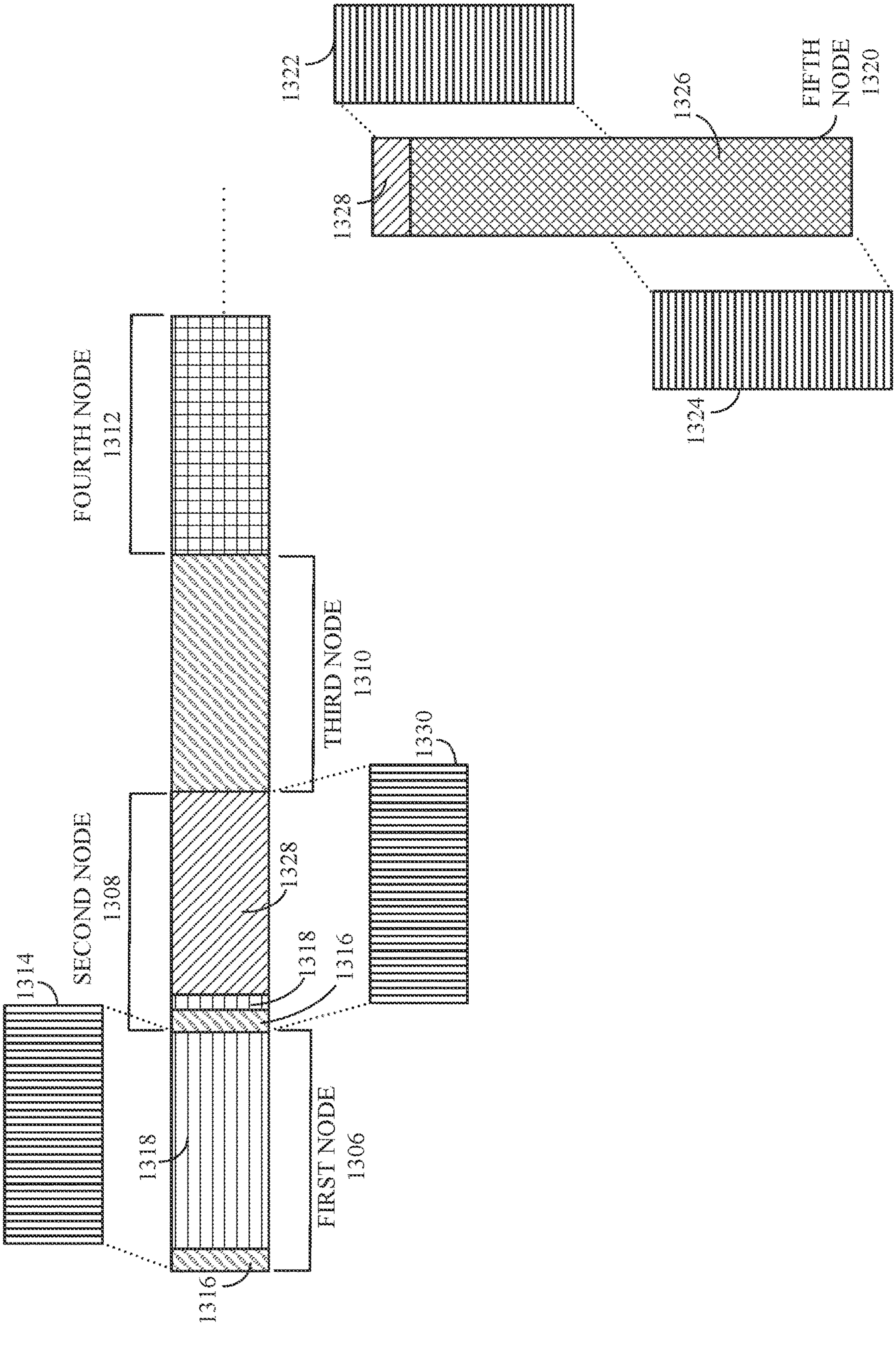

FIG. 13F illustrates a block diagram with elements from fifth node 1320 moved to second node 1308 in accordance with some examples. In some examples, FIG. 13F occurs after the state illustrated in FIG. 13E, such as after elements from fifth node 1320 have been moved to first node 1306. In such examples, FIG. 13F occurs as the melding process iterates over the nodes illustrated in FIG. 13E and progresses further into fifth node 1320. In some examples, operations resulting in difference of FIGS. 13E and 13F occur as a result of third node 1320 being a set of void elements (e.g., a full void leaf as described above). In other examples, operations discussed with respect to FIG. 13G occur before operations discussed with respect to FIG. 13F, including moving elements from third node 1310 to fifth node 1320 to fill up fifth node 1320 before moving elements to second node 1308.

As illustrated in FIG. 13F, second node 1308 is no longer empty and includes a portion of elements (e.g., 29 elements) included in fifth 1320 in FIG. 13D. In some examples, such elements corresponding to those previously included in fifth node 1320 have been moved to second node 1308, as illustrated by pattern 1318 being in second node 1308 and followed by a portion of pattern 1328 in the same order as illustrated in fifth node 1320 in FIG. 13E.

It should be recognized that pattern 1316 in second node 1308 of FIG. 13F was not included in fifth node 1320 in FIG. 13E and second node 1308 in FIG. 13C. In some examples, such difference is a result of determining that second node 1308 should have 3 void elements and that it previously did not have any. As described above, the determining can be based on a predefined threshold of void elements, a constant amount determined for each leaf element in the tree including second node 1308, or an amount determined specifically for second node 1308 (e.g., such as taking into account past, current, and/or future use related to second node 1308). In some examples, the addition of 3 void elements that were not previously included in fifth node 1320 (e.g., as of FIG. 13E) causes a void balance for the melding process to be at −5 (−2+−3), representing that the melding process has used three void elements that it did not have and will need to make up for those later in the melding process. Before this point, because only 2 void elements were added without having in fifth node 1320, the void balance was at −2.

As illustrated in FIG. 13F, fifth node 1320 includes pattern 1328 (corresponding to elements previously included in second node 1308 (e.g., in FIG. 13C)) and pattern 1326 (corresponding to empty elements as described above). In some examples, fifth node 1320 still include pattern 1328 because those elements were what were left over after filling (e.g., up to 32 elements) second node 308 after adding the determined number of void elements. In some examples, pattern 1328 is at the top (e.g., beginning) of fifth node 1320 because elements corresponding to patterns before pattern 1328 in FIG. 13E have been popped (e.g., moved out) and now elements corresponding to pattern 1328 are at the beginning of fifth node 1320.

FIG. 13F also illustrates that first node 1306, third node 1310, and fourth node 1312 have maintained the same pattern as illustrated in FIG. 13E (e.g., representing that nothing has occurred with respect to those nodes). It should be recognized that, in some examples, elements in second node 1308 are not moved back and forth to fifth node 1320 but rather copied such that elements in fifth node 1320 corresponding to second node 1308 are shifted to the right to start taking up elements in third node 1310 in FIG. 13F.

Figure 13G:
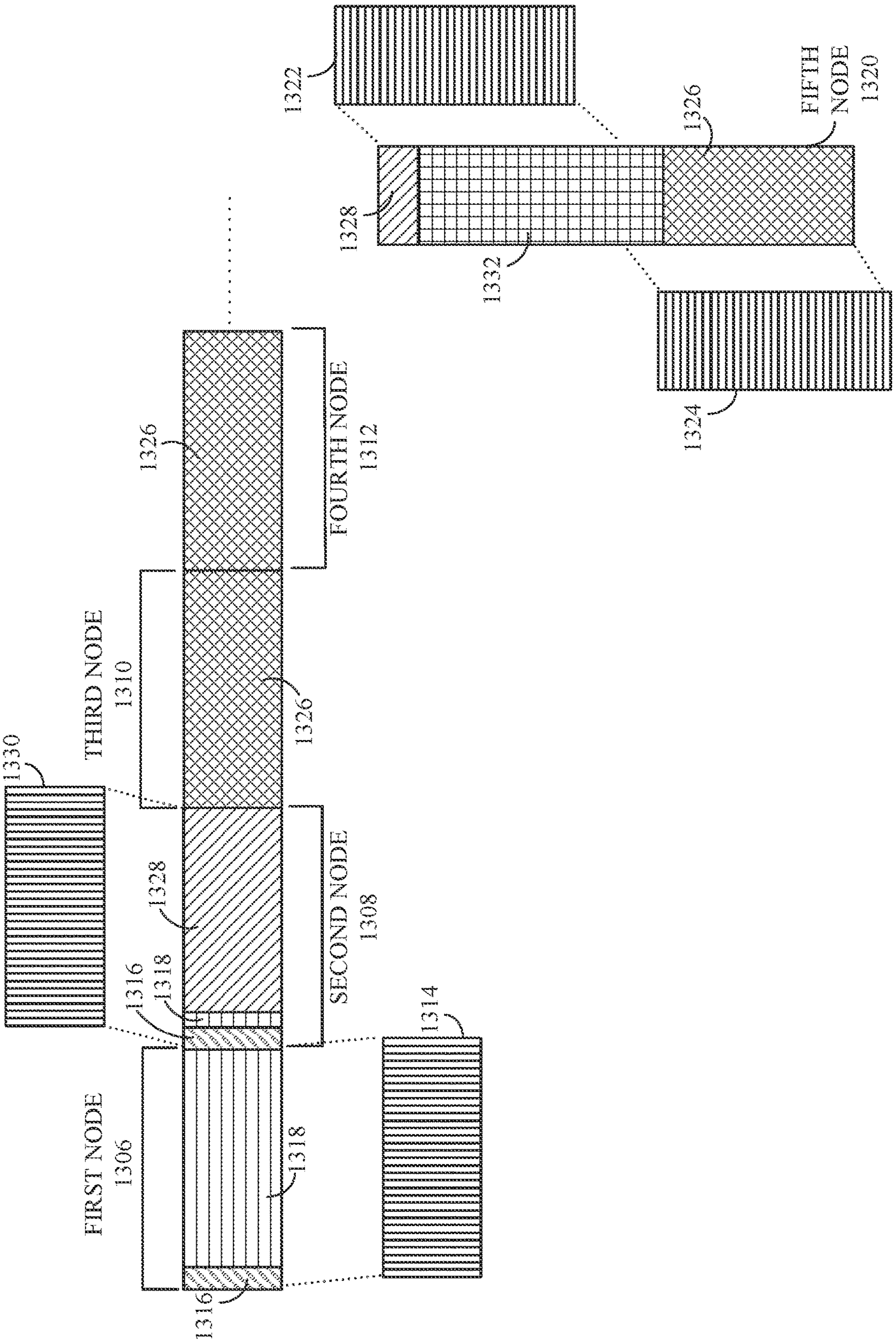

FIG. 13G illustrates a block diagram with elements from fourth node 1312 moved to fifth node 1320 in accordance with some examples. In some examples, FIG. 13G occurs after the state illustrated in FIG. 13F, such as after elements corresponding to fifth node 1320 have been moved to second node 1308. In such examples, FIG. 13F occurs as the melding process iterates over the nodes illustrated in FIG. 13F and progresses passed second node 1308 and/or third node 1310. In some examples, the melding process does not move elements from third node 1310 to fifth node 1320 as a result of all elements in third node 1320 (e.g., as of FIG. 13F) being void elements. In such examples, instead of moving elements from third node 1310 to fifth node 1320, the void balance is increased by the number of void elements in third node 1320 (e.g., 32), resulting in void balance of 27

(e.g., −5+32). In other examples, elements from third node 1310 are moved to fifth node 1320 as described above with respect to other nodes (e.g., first node 306 in FIG. 13C and/or second node 308 in FIG. 13D). In such examples, the melding process can continue as described above and/or below with respect to elements in further nodes.

As illustrated in FIG. 13G, third node 1310 and fourth node 1312 are empty (e.g., elements previously (e.g., in FIG. 13F) included in fourth node 1312 are no longer in fourth node 1312, as illustrated by pattern 1326 in fourth node 1312 in FIG. 13G). In some examples, such elements corresponding to those previously included in fourth node 1312 have been moved to fifth node 1320, as illustrated by pattern 1332 being below (e.g., after) elements corresponding to second node 1308 in fifth node 1320 in the same order and amount as illustrated in fifth node 1312 in FIG. 13F.

FIG. 13G also illustrates that first node 1306 and second node 1308 have maintained the same pattern as illustrated in FIG. 13F (e.g., representing that nothing has occurred with respect to those nodes). It should be recognized that, in some examples, elements in fourth node 1312 are not moved to fifth node 1320 but rather copied such that elements in fifth node 1312 remain.

Figure 13H:
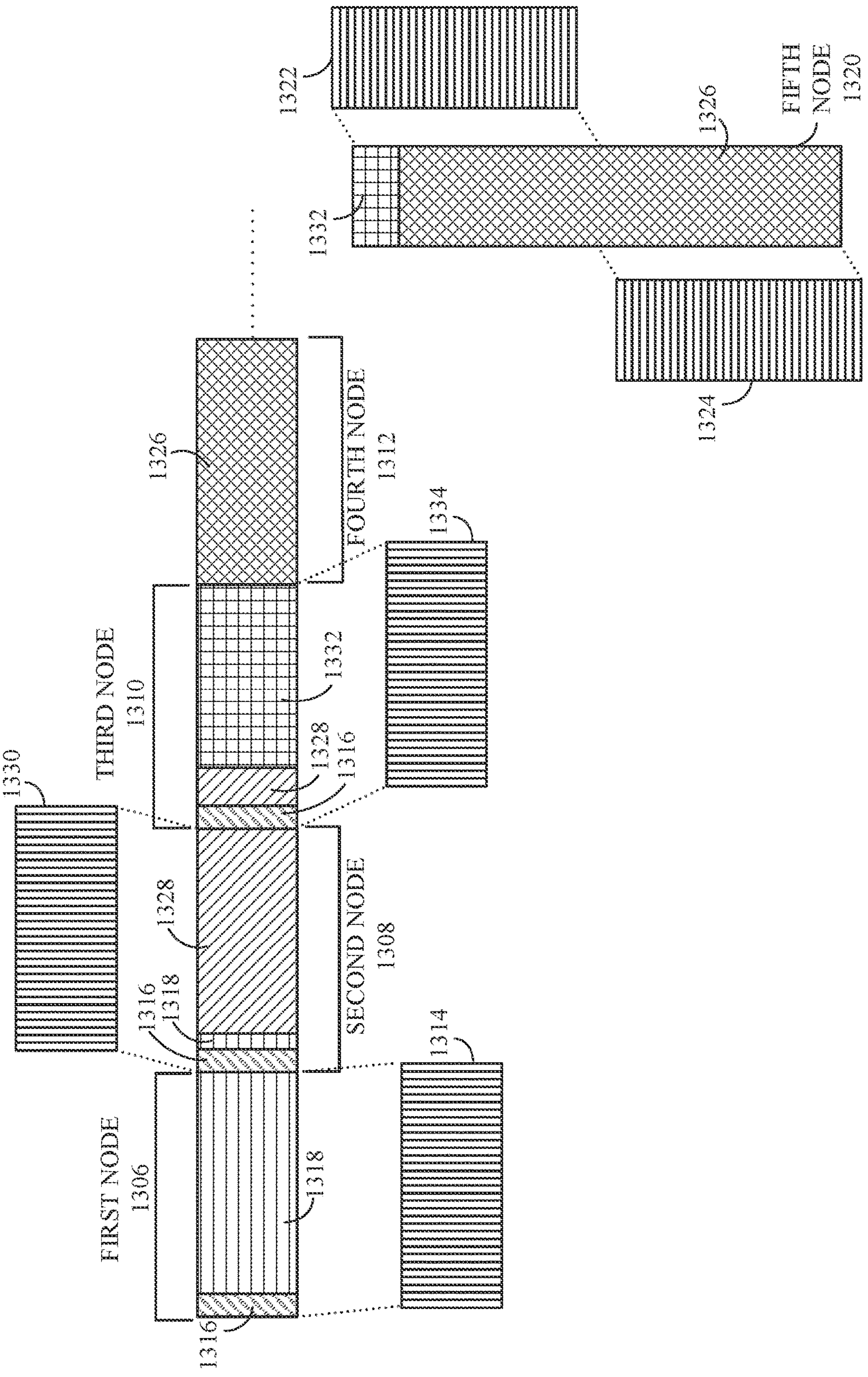

FIG. 13H illustrates a block diagram with elements from fifth node 1320 moved to third node 1310 in accordance with some examples. In some examples, FIG. 13H occurs after the state illustrated in FIG. 13G, such as after elements from fourth node 1312 have been moved to fifth node 1320. In such examples, FIG. 13H occurs as the melding process iterates over the nodes illustrated in FIG. 13G and progresses further into fifth node 1320. In some examples, operations resulting in difference of FIGS. 13G and 13H occur as a result of enough elements being included in fifth node 1320 with void elements in the void balance to fill third node 1310.

As illustrated in FIG. 13H, third node 1310 is no longer empty and includes a portion of elements (e.g., 29 elements) included in fifth 1320 in FIG. 13G. In some examples, such elements corresponding to those previously included in fifth node 1320 have been moved to third node 1310, as illustrated by pattern 1328 being in third node 1310 and followed by a portion of pattern 1332 in the same order as illustrated in fifth node 1320 in FIG. 13G.

It should be recognized that pattern 1316 in third node 1310 of FIG. 13G was not included in fifth node 1320 in FIG. 13G and third node 1310 in FIG. 13D. In some examples, such difference is a result of determining that third node 1310 should have 3 void elements and that it previously did not have any. As described above, the determining can be based on a predefined threshold of void elements, a constant amount determined for each leaf element in the tree including third node 1310, or an amount determined specifically for third node 1310 (e.g., such as taking into account past, current, and/or future use related to third node 1310). In some examples, the addition of three void elements that were not previously included in fifth node 1320 (e.g., as of FIG. 13G) causes a void balance for the melding process to be at 24 (27+−3), representing that the melding process has used three void elements and still has 24 to be used in the future.

As illustrated in FIG. 13H, fifth node 1320 includes pattern 1332 (corresponding to elements previously included in fourth node 1308 (e.g., in FIG. 13D)) and pattern 1326 (corresponding to empty elements as described above). In some examples, fifth node 1320 still includes pattern 1332 because those elements were what were left over after filling (e.g., up to 32 elements) third node 1310 after adding the determined number of void elements. In some examples, pattern 1332 is at the top (e.g., beginning) of fifth node 1320 because elements corresponding to patterns before pattern 1332 in FIG. 13G have been popped (e.g., moved out) and now elements corresponding to pattern 1332 are at the beginning of fifth node 1320.

FIG. 13H also illustrates that first node 1306, second node 1308, and fourth node 1312 have maintained the same pattern as illustrated in FIG. 13G (e.g., representing that nothing has occurred with respect to those nodes). It should be recognized that, in some examples, elements in third node 1310 are not moved back and forth to fifth node 1320 but rather copied such that elements in fifth node 1320 corresponding to fourth node 1312 are shifted to the left to start taking up elements in third node 1310 in FIG. 13H.

Figure 13I:
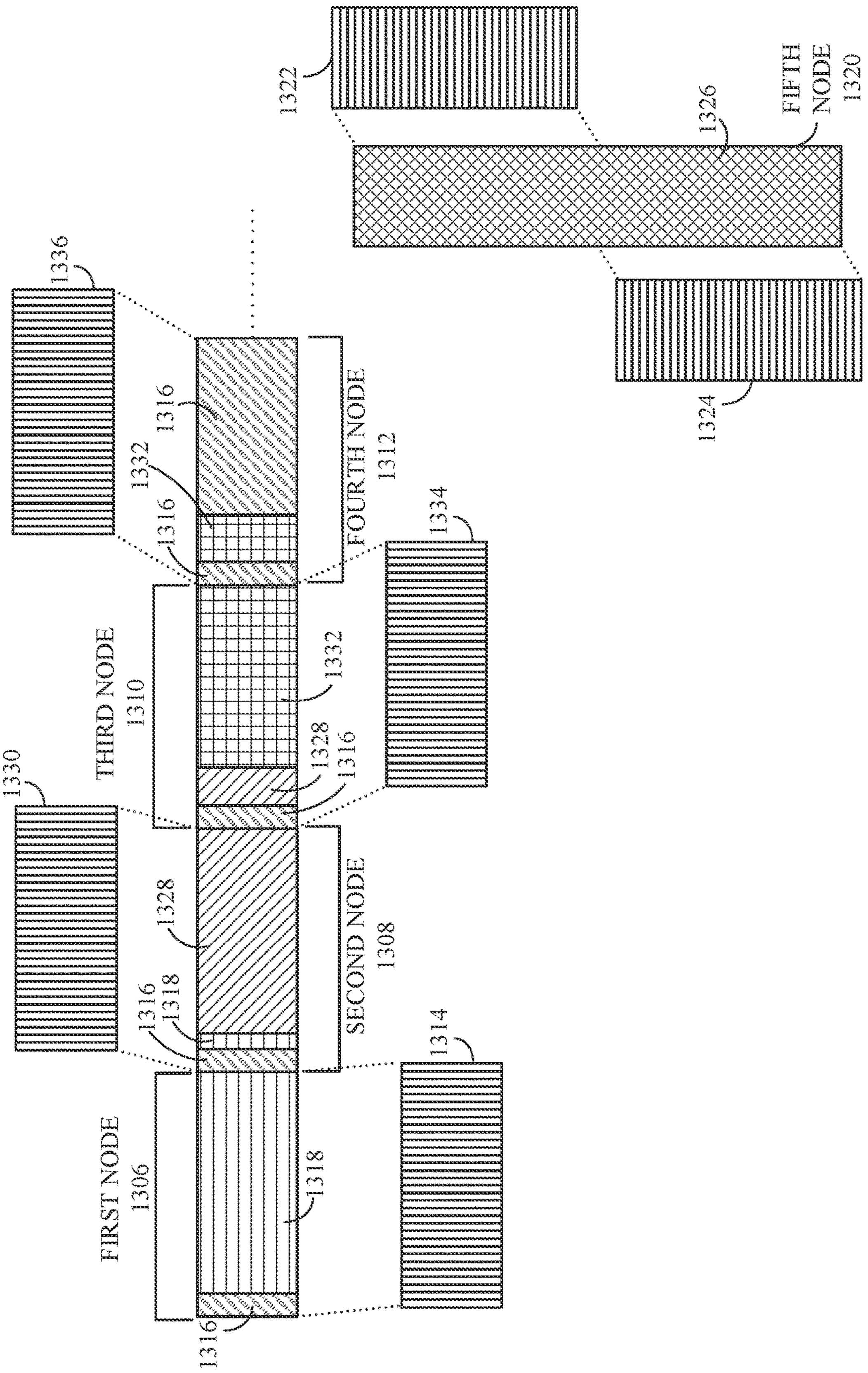

FIG. 13I illustrates a block diagram with elements from fifth node 1320 moved to fourth node 1312 in accordance with some examples. In some examples, FIG. 13I occurs after the state illustrated in FIG. 13H, such as after elements from fifth node 1320 have been moved to third node 1310. In such examples, FIG. 13I occurs as the melding process iterates over the nodes illustrated in FIG. 13H and progresses further into fifth node 1320. In some examples, operations resulting in difference of FIGS. 13H and 13I occur as a result of number of nodes remaining becoming 0.

As illustrated in FIG. 13I, fourth node 1312 is no longer empty and includes a portion of elements (e.g., 6 elements) included in fifth 1320 in FIG. 13GH. In some examples, such elements corresponding to those previously included in fifth node 1320 have been moved to fourth node 1312, as illustrated by pattern 1332 being in fourth node 1312 in the same amount as illustrated in fifth node 1320 in FIG. 13H.

It should be recognized that pattern 1316 in beginning (e.g., left side) of fourth node 1312 of FIG. 13I was not included in fifth node 1320 in FIG. 13H and fourth node 1312 in FIG. 13E. In some examples, such difference is a result of determining that fourth node 1312 should have 3 void elements. As described above, the determining that fourth node 1312 should have 3 void elements can be based on a predefined threshold of void elements, a constant amount determined for each leaf element in the tree including fourth node 1312, or an amount determined specifically for fourth node 1312 (e.g., such as taking into account past, current, and/or future use related to fourth node 1312). In some examples, the addition of 3 void elements that were not previously included in fifth node 1320 (e.g., as of FIG. 13H) causes a void balance for the melding process to be at 21 (24+−3), representing that the melding process has used three void elements and still has 21 to be used in the future. In some examples, the addition of 23 (32−9) void elements that were not previously included in fifth node 1320 (e.g., as of FIG. 13H) and fourth node 1312 (e.g., as of FIG. 13E) causes a void balance for the melding process to be at −2 (21+−23), representing that the melding process has used two void elements and will need to make up for those later in the melding process, include less void elements in fifth node 1312, and/or get more memory to make up for ending at a deficit.

As illustrated in FIG. 13I, fifth node 1320 includes pattern 1326 (corresponding to empty elements as described above). In some examples, fifth node 1320 does not include any pattern other than pattern 1326 because there are no elements left over after filling (e.g., up to 32 elements) fourth node 1312 after adding the determined number of void elements.

FIG. 13I also illustrates that first node 1306, second node 1308, and third node 1310 have maintained the same pattern as illustrated in FIG. 13H (e.g., representing that nothing has occurred with respect to those nodes). It should be recognized that, in some examples, elements in fourth node 1312 are not moved back and forth to fifth node 1320 but rather copied such that elements in fifth node 1320 corresponding to fourth node 1312 are maintained in their position after being shifted with respect to discussion above.

In some examples, the melding process ends with positive void balance. In such examples, the melding process can return void elements to numUU 1304 (which is illustrated in FIG. 13A).

Figure 14:
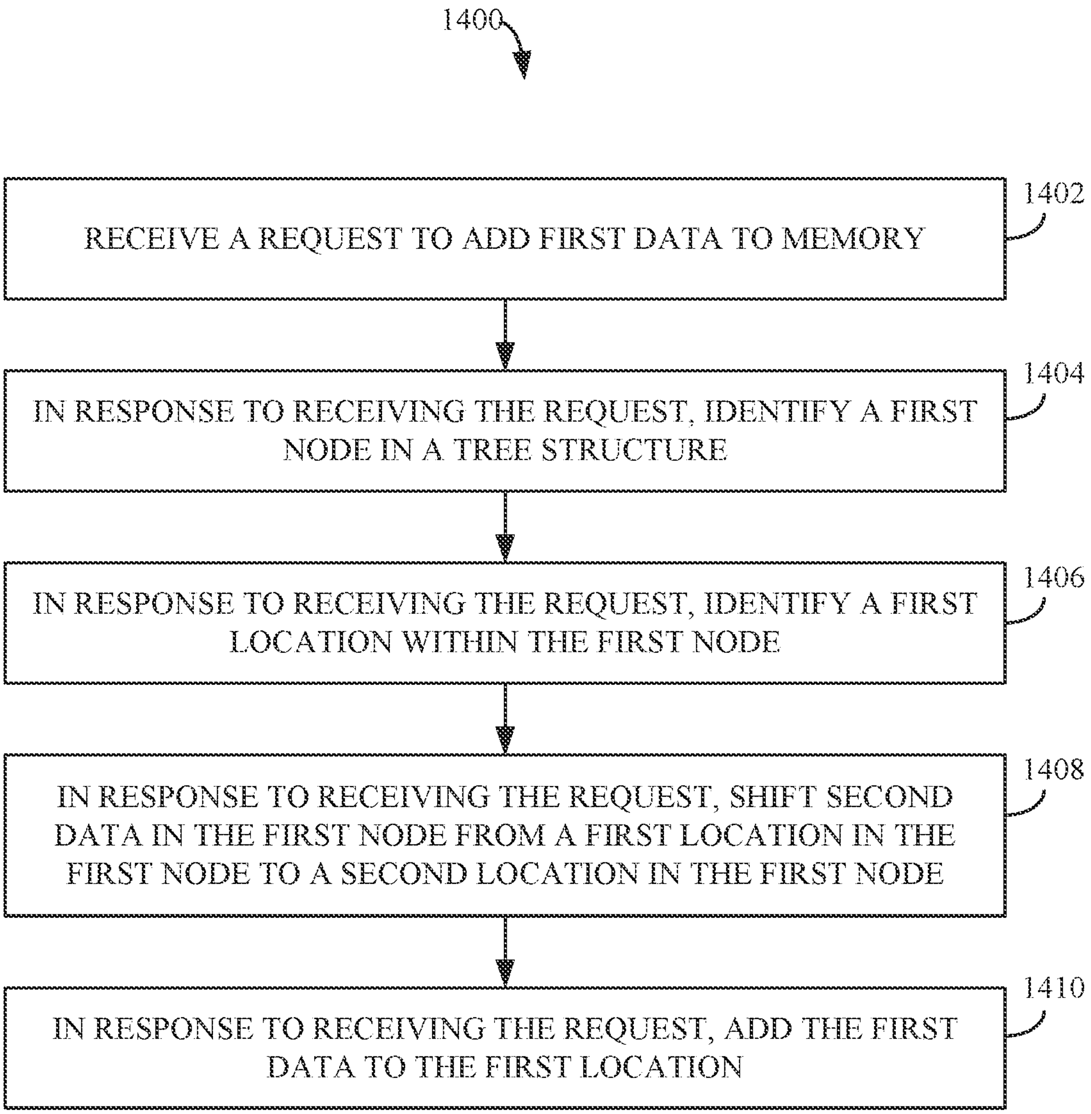
FIG. 14 is a flow diagram illustrating a method for adding an element to a data structure in accordance with some examples.

FIG. 14 is a flow diagram illustrating a method (e.g., method 1400) for adding an element to a data structure in accordance with some examples. Some operations in method 1400 are, optionally, combined, the orders of some operations are, optionally, changed, and some operations are, optionally, omitted.

At 1402, the computer system receives a request to add first data to memory (e.g., volatile or non-volatile memory) (e.g., a physical storage device) (e.g., a request to update the memory to include the first data). In some examples, receiving the request include detecting input (e.g., user input) to add the first data to the memory. In some examples, the request is received without user input (e.g., an application and/or software program sends the request).

At 1404, in response to receiving the request to add the first data to the memory, the computer system identifies a first node in a tree structure (e.g., a memory tree). In some examples, the first node is a leaf node. In some examples, the tree structure indicates where data is stored in the memory. In some examples, a first level of the tree structure includes a different number of nodes than a second level of the tree structure. In some examples, a second node of the tree structure includes a different number of children nodes than a third node of the tree structure. In some examples, the first node is a leaf node. In some examples, the second node is a branch node. In some examples, the second node is a leaf node. In some examples, the first node is identified via a search of the tree structure. In some examples, the first node is identified based on a key corresponding to the first data being between a low value and a high value of the first node.

At 1406, in response to receiving the request to add the first data to the memory, the computer system identifies a first location within the first node. In some examples, key values before the first location are less than a key value corresponding to the first data. In some examples, when identifying the first location, a key value corresponding to the first location is higher than a key value corresponding to the first data. In some examples, the first location is identified via a search of the tree structure. In some examples, the first location is identified when identifying the first node.

At 1408, in response to receiving the request to add the first data to the memory, the computer system shifts second data in the first node from a first location in the first node to a second location in the first node, wherein the second location is different from the first location. In some examples, the first node includes the first location and the second location before receiving the request to add the first data to the memory. In some examples, shifting the second data from the first location to the second location includes copying and/or moving the second data from the first location to the second location. In some examples, the second data is shifted to the right in the memory. In some examples, the second location is and/or includes unused memory in the first node. In some examples, the second location is and/or includes a void element. In some examples, the first node is continuous memory that includes the first location and the second location. In some examples, the first node consists of keys. In some examples, the first node is a continuous stream of keys. In some examples, values corresponding to keys stored in the first node are located in a different portion of memory.

At 1410, in response to receiving the request to add the first data to the memory, the computer system adds (e.g., write) (e.g., after shifting the second data in first node to the second location in the first node) the first data to the first location. In some examples, adding the first data to the first location includes forgoing updating a branch node corresponding to the first node.

In some examples, the tree structure includes a third node and a fourth node different from the third node. In some examples, the third node includes a different number of void elements than the fourth node. In some examples, each of the third node and the fourth node is a leaf node of the tree structure (e.g., nodes without children). In some examples, the number of void elements in the third node and the fourth node are the same.

In some examples, in response to receiving the second request to add the second data to the memory, the computer system identifies a fifth node in the tree structure. In some examples, in response to receiving the second request to add the second data to the memory, in accordance with a determination that the fifth node does not include a void element, and that a sixth node in the tree structure includes a respective void element, the computer system shifts third data from a location in the fifth node to a location in the sixth node. In some examples, the location in the sixth node corresponds to the respective void element in the sixth node. In some examples, the location in the sixth node does not correspond to the respective void element in the sixth node and instead fourth data from a location in the sixth node is shifted to a location in the sixth node corresponding to the respective voice element in the sixth node. In some examples, in response to receiving the second request to add the second data to the memory, in accordance with a determination that the fifth node does not include a void element, that the sixth node does not include a void element, and that a seventh node in the tree structure includes a respective void element, the computer system shifts fifth data (e.g., the third data or different data) from a location in the fifth node to a location in the seventh node. In some examples, the computer system updates a state of the tree structure to reflect shifting the third data (e.g., a branch node of the tree structure is modified and/or updated (e.g., a key, of the branch node, that corresponds to a respective node (e.g., a leaf node) of the tree structure is changed from a first value to a second value)).

In some examples, in accordance with a determination that the tree structure needs additional void elements, the computer system adds one or more void elements to the tree structure at a predetermined location (e.g., the end and/or after a current last element of tree structure) of the memory. In some examples, the one or more void elements includes a predefined number of void elements that is not based on a size of the tree structure and/or a node of the tree structure. In some examples, the one or more void elements includes a predefined number of void elements that is based on a size of the tree structure and/or a node of the tree structure. In some examples, in accordance with a determination that the tree structure does not need additional void elements, forgoing adding a void element to the tree structure.

In some examples, the tree structure includes an eighth node and a ninth node different from the eighth node. In some examples, after adding the one or more void elements to the tree structure at the predetermined location of the memory and in accordance with a determination that the eighth node needs an additional void element, the computer system adds, using the one or more void elements, a first number of void elements to the eighth node. In some examples, the first number of void elements are added to the end of the eighth node. In some examples, after adding the one or more void elements to the tree structure at the predetermined location of the memory and in accordance with a determination that the eighth node needs an additional void element, the computer system modifies (e.g., based on adding the first number of void elements) a value (e.g., a key) of a ninth node (e.g., a branch node of the eighth node) (e.g., the eight node is a leaf node of the ninth node). In some examples, after adding the one or more void elements to the tree structure at the predetermined location of the memory and in accordance with a determination that the eighth node does not need an additional void element, the computer system forgoes adding the first number of void elements to the eighth node. In some examples, after adding the one or more void elements to the tree structure at the predetermined location of the memory and in accordance with a determination that the eighth node does not need an additional void element, the computer system forgoes modifying the value of the ninth node.

In some examples, in accordance with a determination that a tenth node, different from the eighth node, needs an additional void element, the computer system adds, using the one or more void elements, a second number of void elements to the tenth node, wherein the second number is different from the first number. In some examples, the second number of void elements are added to the end of the eighth node.

In some examples, the tree structure includes an eleventh node and an twelfth node different from the eleventh node. In some examples, after adding the one or more void elements to the tree structure at the predetermined location of the memory, the computer system adds, using the one or more void elements, a third number of void elements to the eleventh node. In some examples, after adding the one or more void elements to the tree structure at the predetermined location of the memory, the computer system adds, using the one or more void elements, the third number of void elements to the twelfth leaf node.

In some examples, the one or more void elements are added to the tree structure in response to a determination that a first computer system is idle. In some examples, adding the first number of void elements to the eighth node, the second number of void elements to the tenth node, the third number of void elements to the eleventh node, and/or the third number of void elements to the twelfth node occurs in response to a determination that the computer system is idle. In some examples, the computer system is executing the tree structure.

In some examples, in accordance with a determination that a respective node (e.g., the first node, the second node, the eighth node, the ninth node, or a different node) in the tree structure includes less than a predetermined number of void elements, the computer system requests, by the respective node, one or more additional void elements, wherein determining whether the eighth node needs an additional void element includes determining whether the eighth node has requested one or more additional void elements.

In some examples, before adding the one or more void elements to the tree structure, the computer system calculates, based on a plurality of nodes of the tree structure, a number of void elements to add to the tree structure, wherein the one or more void elements includes the number of void elements. In some examples, the number of void elements included in the one or more void elements is a default number that is not based on the tree structure. In some examples, the calculating is based on a single node of the tree structure.

In some examples, after adding the one or more void elements to the tree structure at the predetermined location of the memory and while performing a process to add the one or more void elements to one or more nodes in the tree structure, the computer system determines that a predefined time threshold corresponding to the process has been reached. In some examples, in response to determining that the predefined time threshold has been reached, the computer system causes the process to be terminated (e.g., immediately or after adding one or more void elements to a current node in the tree structure) before adding a void element to a respective node in the tree structure. In some examples, the respective node has requested an additional void element. In some examples, the process is terminated in accordance with a determination that the respective node needs an additional void element.

In some examples, after causing the process to be terminated and in accordance with a determination that a second computer system is idle, the computer system continues the process.

Note that details of the processes described above with respect to method 1400 (e.g., FIG. 14) are also applicable in an analogous manner to the methods described herein. For example, method 900 optionally includes one or more of the characteristics of the various methods described above with reference to method 1400. For example, the search query of method 900 can be with respect to the tree structure of method 1400. For brevity, these details are not repeated below.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method, comprising:

receiving a first request to add first data to memory;

in response to receiving the first request to add the first data to the memory:

identifying a first node in a tree structure, wherein the first node includes one or more data elements including a second data while receiving the first request to add the first data to the memory;

identifying a first location within the first node;

shifting the second data in the first node from a first location in the first node to a second location in the first node, wherein the second location is different from the first location;

storing the first data in the first location in the first node;

receiving a second request to add second data to the memory; and in response to receiving the second request to add the second data to the memory:

identifying a fifth node in the tree structure;

in accordance with a determination that the fifth node does not include a void element and in accordance with a determination that a sixth node in the tree structure includes a respective void element, shifting third data from a location in the fifth node to a location in the sixth node; and updating a state of the tree structure to reflect shifting the third data.

2. The method of claim 1, further comprising:

in accordance with a determination that the tree structure needs additional void elements, storing one or more void elements to the tree structure at a predetermined location of the memory.

3. The method of claim 2, wherein the tree structure includes an eighth node and a ninth node different from the eighth node, the method further comprising:

after storing the one or more void elements to the tree structure at the predetermined location of the memory:

in accordance with a determination that the eighth node needs an additional void element:

storing, using the one or more void elements, a first number of void elements to the eighth node; and modifying a value of a ninth node; and in accordance with a determination that the eighth node does not need an additional void element:

forgoing storing the first number of void elements to the eighth node; and forgoing modifying the value of the ninth node.

4. The method of claim 2, wherein the tree structure includes an eleventh node and a twelfth node different from the eleventh node, the method further comprising:

after storing the one or more void elements to the tree structure at the predetermined location of the memory:

storing, using the one or more void elements, a third number of void elements to the eleventh node; and storing, using the one or more void elements, the third number of void elements to the twelfth leaf node.

5. The method of claim 2, further comprising:

in accordance with a determination that a respective node in the tree structure includes less than a predetermined number of void elements, requesting, by the respective node, one or more additional void elements, wherein determining whether the eighth node needs an additional void element includes determining whether the eighth node has requested one or more additional void elements.

6. A non-transitory computer-readable storage medium storing one or more programs configured to be executed by one or more processors of a computer system, the one or more programs including instructions for:

receiving a first request to add first data to memory;

in response to receiving the first request to add the first data to the memory:

identifying a first node in a tree structure, wherein the first node includes one or more data elements including a second data while receiving the first request to add the first data to the memory;

identifying a first location within the first node;

shifting the second data in the first node from a first location in the first node to a second location in the first node, wherein the second location is different from the first location;

storing the first data in the first location in the first node;

receiving a second request to add second data to the memory; and in response to receiving the second request to add the second data to the memory:

identifying a fifth node in the tree structure;

in accordance with a determination that the fifth node does not include a void element and in accordance with a determination that a sixth node in the tree structure includes a respective void element, shifting third data from a location in the fifth node to a location in the sixth node; and updating a state of the tree structure to reflect shifting the third data.

7. A computer system, comprising:

one or more processors; and memory storing one or more programs configured to be executed by the one or more processors, the one or more programs including instructions for:

receiving a first request to add first data to memory;

in response to receiving the first request to add the first data to the memory:

identifying a first node in a tree structure, wherein the first node includes one or more data elements including a second data while receiving the first request to add the first data to the memory;

identifying a first location within the first node;

shifting the second data in the first node from a first location in the first node to a second location in the first node, wherein the second location is different from the first location;

storing the first data in the first location in the first node;

receiving a second request to add second data to the memory; and in response to receiving the second request to add the second data to the memory:

identifying a fifth node in the tree structure;

in accordance with a determination that the fifth node does not include a void element and in accordance with a determination that a sixth node in the tree structure includes a respective void element, shifting third data from a location in the fifth node to a location in the sixth node; and updating a state of the tree structure to reflect shifting the third data.

8. The non-transitory computer-readable storage medium of claim 6, the one or more programs further including instructions for:

in accordance with a determination that the tree structure needs additional void elements, storing one or more void elements to the tree structure at a predetermined location of the memory.

9. The non-transitory computer-readable storage medium of claim 8, wherein the tree structure includes an eighth node and a ninth node different from the eighth node, the one or more programs further including instructions for:

after storing the one or more void elements to the tree structure at the predetermined location of the memory:

in accordance with a determination that the eighth node needs an additional void element:

storing, using the one or more void elements, a first number of void elements to the eighth node; and modifying a value of a ninth node; and in accordance with a determination that the eighth node does not need an additional void element:

forgoing storing the first number of void elements to the eighth node; and forgoing modifying the value of the ninth node.

10. The non-transitory computer-readable storage medium of claim 8, wherein the tree structure includes an eleventh node and a twelfth node different from the eleventh node, the one or more programs further including instructions for:

after storing the one or more void elements to the tree structure at the predetermined location of the memory:

storing, using the one or more void elements, a third number of void elements to the eleventh node; and storing, using the one or more void elements, the third number of void elements to the twelfth leaf node.

11. The non-transitory computer-readable storage medium of claim 8, the one or more programs further including instructions for:

in accordance with a determination that a respective node in the tree structure includes less than a predetermined number of void elements, requesting, by the respective node, one or more additional void elements, wherein determining whether the eighth node needs an additional void element includes determining whether the eighth node has requested one or more additional void elements.

12. The computer system of claim 7, the one or more programs further including instructions for:

in accordance with a determination that the tree structure needs additional void elements, storing one or more void elements to the tree structure at a predetermined location of the memory.

13. The computer system of claim 12, wherein the tree structure includes an eighth node and a ninth node different from the eighth node, the one or more programs further including instructions for:

after storing the one or more void elements to the tree structure at the predetermined location of the memory:

in accordance with a determination that the eighth node needs an additional void element:

storing, using the one or more void elements, a first number of void elements to the eighth node; and modifying a value of a ninth node; and in accordance with a determination that the eighth node does not need an additional void element:

forgoing storing the first number of void elements to the eighth node; and forgoing modifying the value of the ninth node.

14. The computer system of claim 12, wherein the tree structure includes an eleventh node and a twelfth node different from the eleventh node, the one or more programs further including instructions for:

after storing the one or more void elements to the tree structure at the predetermined location of the memory:

storing, using the one or more void elements, a third number of void elements to the eleventh node; and storing, using the one or more void elements, the third number of void elements to the twelfth leaf node.

15. The computer system of claim 12, the one or more programs further including instructions for:

in accordance with a determination that a respective node in the tree structure includes less than a predetermined number of void elements, requesting, by the respective node, one or more additional void elements, wherein determining whether the eighth node needs an additional void element includes determining whether the eighth node has requested one or more additional void elements.

* * * * *